(12) United States Patent
Hakki et al.

(10) Patent No.: US 7,523,891 B2
(45) Date of Patent: Apr. 28, 2009

(54) SAFETY PRE-IMPACT DECELERATION SYSTEM FOR VEHICLES

(76) Inventors: A-Hamid Hakki, 1508 Sturbridge Ct., Dunedin, FL (US) 34698-2260; Sam Hakki, P.O. Box 517, Bay Pines, FL (US) 33744; Said I. Hakky, 8547 Merrimoor Blvd. East, Largo, FL (US) 33777-3145

( * ) Notice: Subject to any disclaimer, the term of this patent is extended or adjusted under 35 U.S.C. 154(b) by 595 days.

(21) Appl. No.: 11/312,738

(22) Filed: Dec. 21, 2005

(65) Prior Publication Data

US 2007/0145193 A1 Jun. 28, 2007

(51) Int. Cl.
*B64D 17/80* (2006.01)
(52) U.S. Cl. .................................. 244/152; 244/139
(58) Field of Classification Search ................ 244/142, 244/145, 149, 152, 139, 137.3
See application file for complete search history.

(56) References Cited

U.S. PATENT DOCUMENTS

| | | | |
|---|---|---|---|
| 3,822,076 A | 7/1974 | Mercier et al. |
| 4,817,555 A | 4/1989 | Meinen |
| 4,996,936 A | 3/1991 | Brundritt |
| 5,338,061 A | 8/1994 | Nelson et al. |
| 5,431,463 A | 7/1995 | Chou |
| 5,489,117 A | 2/1996 | Huber |
| 5,568,903 A | 10/1996 | Pena et al. |
| 5,725,265 A | 3/1998 | Baber |
| 5,810,293 A | 9/1998 | Leeki-Woo |
| 6,056,336 A | 5/2000 | Balgobin |
| 6,106,038 A | 8/2000 | Dreher |
| 6,209,909 B1 | 4/2001 | Breed |
| 6,213,496 B1 | 4/2001 | Minami et al. |
| 6,224,019 B1 | 5/2001 | Peterson et al. |
| 6,227,325 B1 | 5/2001 | Shah |
| 6,260,878 B1 | 7/2001 | Tanase |
| 6,357,786 B1 | 3/2002 | Higashi |
| 6,382,662 B1 | 5/2002 | Igawa |
| 6,419,267 B1 | 7/2002 | Hashimoto et al. |
| 6,439,605 B2 | 8/2002 | Ariyoshi |
| 6,450,556 B1 | 9/2002 | Jacobs |
| 6,467,563 B1 | 10/2002 | Ryan et al. |
| 6,523,855 B2 | 2/2003 | Musiol et al. |
| 6,527,886 B1 | 3/2003 | Yamato et al. |
| 6,543,803 B1 | 4/2003 | Harada et al. |
| 6,554,227 B2 | 4/2003 | Wolter |
| 6,554,313 B2 | 4/2003 | Uchida |
| 6,612,256 B1 | 9/2003 | Martin |
| 6,682,017 B1 | 1/2004 | Giannakopoulos |
| 6,749,218 B2 | 6/2004 | Breed |
| 6,758,442 B2 | 7/2004 | Bailey |

(Continued)

*Primary Examiner*—Timothy D Collins
(74) *Attorney, Agent, or Firm*—Rosenberg, Klein & Lee

(57) ABSTRACT

A safety pre-impact deceleration system for a variety of conveyances includes a parachute structure formed from air bags inflated with gas. Alternatively, the parachute structure includes a canopy with orifices. Air spaces in the parachute structure or orifices in the canopy have adjustable and selective dimensions to control the operational parameters of the vehicle. The system includes sensors and rapid exposure rate cameras with continuous loop recording to measure operational parameters of the vehicle and to predict possible collision. Once a collision condition is detected, audio/video images are stored on storage media. The air bags are deployed and inflated. In addition to air bags constituting the parachute structure, a plurality of air bags are provided to be deployed external the vehicle to aid in a safe landing.

18 Claims, 15 Drawing Sheets

U.S. PATENT DOCUMENTS

| | | | |
|---|---|---|---|
| 6,761,334 B1 | 7/2004 | Nutu et al. | |
| 6,772,057 B2 | 8/2004 | Breed et al. | |
| 6,814,019 B2 | 11/2004 | Mears et al. | |
| 6,817,579 B2 | 11/2004 | van der Velden et al. | |

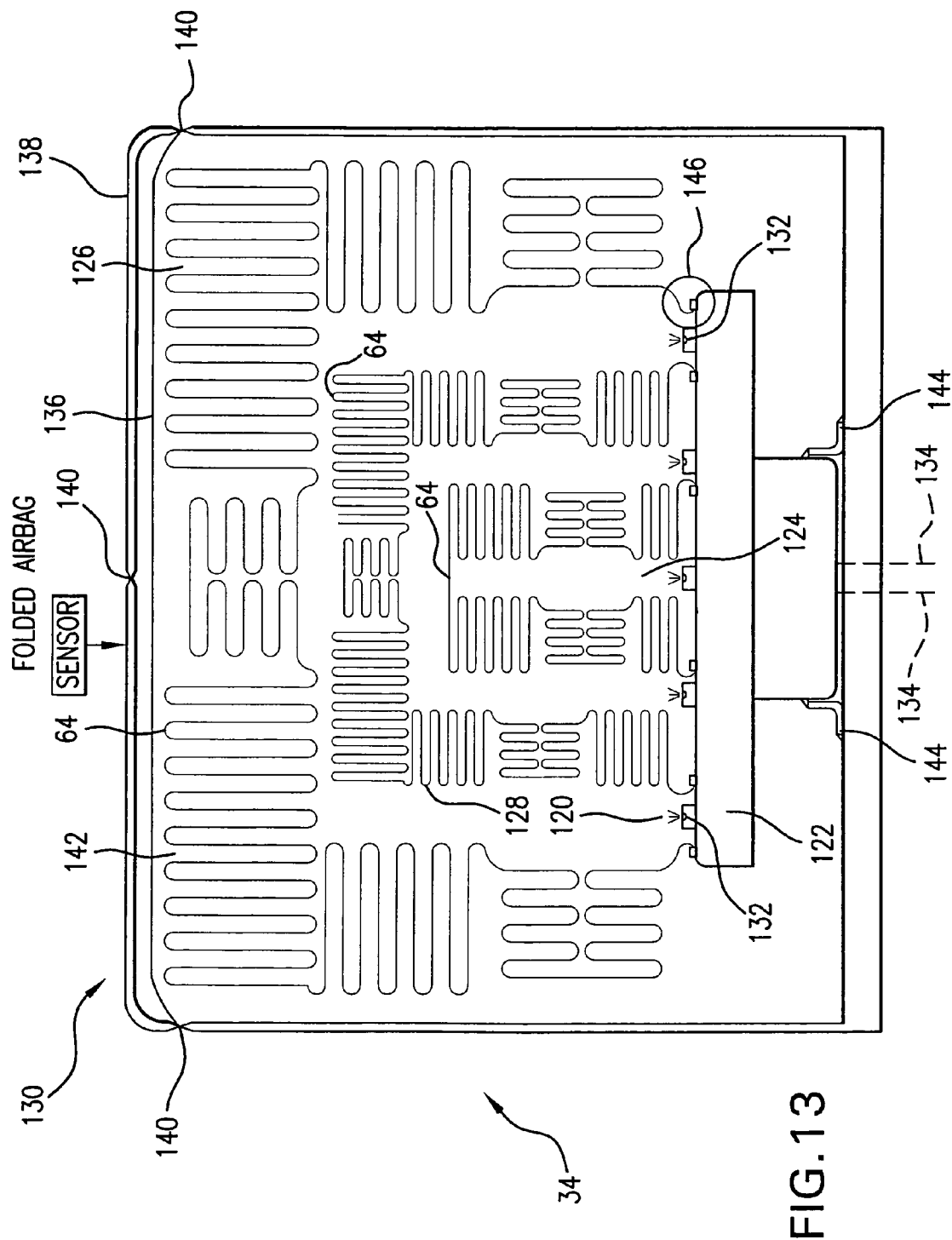

SAFETY PRE-IMPACT DECELERATION SYSTEM FOR VEHICLES

FIELD OF THE INVENTION

The present invention relates to a method and system for protecting both passengers and a vehicle when in a collision. In particular, the present invention relates to a parachute structure having a variable air resistance for a vehicle in motion or in a free fall condition. The system aids in controlling the deceleration as well as steering of the vehicle.

In overall concept, the present invention relates to a pre-impact safety deceleration system which includes a parachute or parachute-like structure with opening(s) or air spaces formed therein which are controllably dimensioned for enhancing the maneuverability of a vehicle once a pre-collision situation is detected.

The present invention also relates to a parachute-like structure which includes a plurality of inflatable airbags arranged in a grid-like structure which are inflated gradually in simultaneous or sequential manner once the deceleration of the vehicle deviates from a predetermined safety range. By means of changing the volume of air in the air bags, the air spaces formed between the airbags are selectively increased or decreased in order to safely land the vehicle.

The present invention further relates to a parachute system which includes an opening (or openings) formed in the parachute's canopy, where a control system adjusts the expansion or contraction of the opening(s) in accordance with collision parameters of the vehicle, including, but not limited to, speed of the vehicle, direction of the motion, deceleration/acceleration and distance to the obstacle, as well as weather conditions, etc. This control system may be implemented in a number of alternative forms. The control system may include a plurality of airbags arranged within the opening(s) which are inflatable/deflatable in a selective manner; or be formed as a fabric member(s) with the controllable overlapping of the opening(s) in the canopy of the parachute; or, alternatively, as a system of crossed cylindrical tubes having variable and selective cross-sectional areas to control the air resistance of the canopy.

In addition, the present invention is directed to a hybrid safety pre-impact system which includes a parachute with the openings having adjustable expansion/contraction of airbags arranged in a grid-like parachute structure. Additionally, a plurality of overlapping airbags are attached to the bottom and the sides (as well as the front and/or rear) of the vehicle. The overlapping air bags are inflatable to form a balloon-like housing surrounding the vehicle at the areas of possible contact with the landing plane in order to ease the force loading upon impact. The overlapping airbags additionally provide a stable flotation system if the vehicle impacts water.

The present invention further relates to a pre-impact safety system which controls the deceleration of a vehicle and is intended to provide a safe landing of the vehicle. The safety system includes pre-collision sensors which trigger airbag inflation once a pre-collision condition has been determined. In the safety system, rapid exposure rate cameras continuously record the audio/video images of the events external and internal to the vehicle. Once the pre-collision is detected the system stores the audio/video images recorded before, during, and immediately after the collision in order to provide documentation of events surrounding the accident. The audio/video images are stored in a memory block for further analysis.

BACKGROUND OF THE INVENTION

Deceleration systems for aircrafts and watercrafts currently rely on either a conventional parachute that is large enough to decrease the speed of the conveyance to a level that is compatible with survival upon impact; or on airbags that cushion the aircraft or watercraft upon collision.

For example, U.S. Pat. No. 6,227,325 teaches a novel design of an external safety bag for a variety of conveyances. Sensing unit senses obstacles and, when a potential collision is detected, safety bags are deployed automatically, or manually.

U.S. Pat. Nos. 4,996,936, 6,814,019, 6,612,256, and 4,817,555 teach emergency systems for flotation intended as safety means actuated after the collision occurred to watercrafts.

U.S. Pat. No. 6,682,017 describes a detachable passenger escape cabin in an aircraft with air bags and a conventional parachute with an opening at the vertex of the canopy of the parachute. This design is likely to create uncontrollably rapid and unwarranted deceleration that may cause injuries and possibly death of passengers. In addition, since the escape cabin separates from the remainder of the aircraft, navigation of the aircraft may be difficult. The external airbags described are conventional one-layered airbags made of thick waterproof fabric with uncontrollable resistance to the impact.

U.S. Pat. No. 5,810,293 describes an emergency landing auxiliary apparatus of an aircraft using a double structure parachute, one on top of the other. U.S. Pat. No. 6,554,227 describes a flight apparatus with a navigation system, parachutes and air bags triggered by radar prior to impact. For flotation, watertight units are taught as well as floodable chambers to stabilizer the unit on the water.

U.S. Pat. No. 6,761,334 describes an aircraft using parachutes that slow descent to the earth. A detachable passenger module has watertight airbags and side mounted fins, as well as a motor for water landing and a position signal emitter.

Conventional air bag systems that are currently used for motor vehicles, generally include an inflatable folded air bag, collision sensors that sense the collision of the vehicle, and generate collision sensing signals. An electronic control unit receives the collision signal and directs the operation of the airbag by signaling the inflator to inject gas or air into the folded air bag. The air bag is then deployed and inflates to the exterior of the vehicle. An externally mounted air bag arrangement is illustrated in U.S. Pat. No. 5,725,265. The air bag is housed in a bumper-like chamber that is activated automatically after impact, and relies upon the cushioning effect of the inflated air bag. However, once the air bag is inflated, it begins to deflate and provides little protection from secondary impacts. U.S. Pat. No. 5,431,463 describes a shock absorber such as rubber cell with a compression spring that deflates upon impact and acts as a cushion. U.S. Pat. No. 6,056,336 describes an air bag with internal shock absorber. The air bag is mounted on the front or rear of the vehicle. The external air bag assembly is located in a cavity in the bumper of the vehicle, and includes a deployable shock-absorbing bumper assembly within the air bag that expands forward and provides additional shock absorbing region. The system is activated manually by the occupants of the vehicle or automatically. External air bags have been also proposed that are triggered before impact by a variety of sensors such as radar, or sonar. U.S. Pat. No. 6,450,556 teaches an exterior air bag system that provides protection by an exteriorly mounted sensor that, upon impact, triggers the deployment of the air bag. The air bag is located on the bottom side of the vehicle and extends laterally inwardly from a lateral side periphery.

All these structures are activated as the result of a collision, and do not detect a pre-collision situation.

An external air bag system is proposed in U.S. Pat. No. 6,106,038, which teaches a system for collision damage reduction triggered by sensors prior to impact. The system reduces contact velocities between a vehicle and an object by use of air bags on the exterior of the vehicle. In a detailed analysis of the physics of the exterior air bags, it was found that compression of the air bags slows a vehicle at a fast and exponential rate. Rates of deceleration exceeding 18 g's are not tolerated by humans due to its effect on the compression of vital organs, such as the brain, of the occupants of the vehicle, which may result in injuries and possibly death. In order to overcome the problem, pressure relief valves are used to expel gas when the compression is under way to retain the car deceleration under 18 g's. Weakly sewn pieces of fabric (0.4 and 0.3 square foot patch) act as relief valves at pressures of 30 and 40 psig. A major drawback of the design is that it may take as long as 200 milliseconds to fully inflate the airbags for an average vehicle.

U.S. Pat. No. 6,209,909 envisions an external air bag stored within the side door to be deployed prior to impact to cushion the vehicles. However, no detailed description of the configuration of the external air bag, or the rate of deceleration, has been provided. The '909 patent addresses pattern recognition techniques and assessment of the probable severity of a pending impact by utilizing ultrasound, electromagnetic waves system, and infrared electromagnetic waves.

U.S. Pat. No. 6,749,218 describes an externally deployed air bags system, including side air bags and external air bags at the front as well as the rear of the vehicle, to cushion a pedestrian struck by a vehicle. U.S. Pat. No. 6,772,057 teaches a system for vehicular monitoring using image processing. The monitoring system is described for the environment interior and exterior of the vehicle. The information thus obtained is utilized to control the inflation of air bags and other systems in the vehicle. A pattern recognition system enables the controlled inflation of the air bags prior and during collision. The monitoring system also assesses passenger position during impact and minimizes collision damage. Cameras are placed in surrounding relationship to the vehicle in order to view the interior as well as the exterior of the vehicle. In contrast to the current invention, prior art cameras are not activated by the air bag triggering mechanism, but rather are used to initiate the deployment of air bags.

Existing inflatable safety devices fail to provide for a parachute structure for deceleration and buoyancy, which would have air spaces (or openings) with adjustable expansion to allow for steering during descent as well as for controlled deceleration of the vehicle in collision. In addition, the existing inflatable safety devices are not inflated by helium or another light gas, nor do they use rapid sequence film cameras to document the events surrounding the collision. Prior art fails to teach the triggering of the cameras by imminent air bag deployment.

SUMMARY OF THE INVENTION

It is an object of the present invention to provide a safety pre-impact deceleration system for vehicles with a parachute structure design having adjustable and controllable orifices for steering the vehicle and control of the deceleration of the vehicle prior to and during a collision to reduce injuries to passengers, damage to cargo, and provide a safe landing of the vehicle.

It is another object of the present invention to provide a safety landing system applicable to a variety of conveyances which when used for aircraft, combine a parachute-like structure comprised of air bags that are inflated by either air or other gases such as Helium, to control the air filled space dimension formed in the parachute-like structure in order to maintain deceleration of the vehicle within a safety range as well as to permit safe maneuvering of the vehicle.

Another object of the present invention is to provide a safety pre-impact inflatable deceleration system which uses a plurality of air bags arranged in a grid-like parachute that are deployed external the vehicle prior to an impact and which are responsively inflated/deflated to a predetermined controllable extent for providing safe deceleration rates of the vehicle. The system further has a plurality of air bags spaced adjacent the bottom and sides of the aircraft and deployable and inflatable upon detection of pre-collision situations to provide for a safe landing on both land or water. The system further provides for flotation on water when needed.

It is another object of the present invention to provide a safety pre-impact deceleration system which uses either a parachute structure formed of a plurality of inflatable air bags arranged in an array-like manner with volume controllable air spaces between the air bags. Alternatively, a parachute may be provided with at least one orifice formed in the canopy with mechanisms for controlling the expansion of the orifice. The mechanism may include inflatable airbags within the opening, cylindrical tubes having controllable cross-sectional areas, or fabric members having controllable overlapping of the orifice.

It is a further object of the present invention to provide a safety landing system for vehicles which includes a sensing system for detecting pre-impact conditions. The system may include an audio/video image recording system having rapid sequence film cameras located inside and outside of the vehicle. The audio/video images associated with the accident may be stored in a memory unit. A control system analyzes the data from the sensors, and issues a control signal to control a pre-collision and collision situation and to provide for additional safety parameters during an emergency landing of the vehicle by directing airbag deployment and inflating the air bags in a controlled fashion.

It is a further object of the present invention to provide a safety pre-impact system which includes a plurality of air bags both in the parachute structure and in an air bag envelope surrounding the vehicle on the sides, top, and bottom thereof. The safety pre-impact system further includes a control system which, based on detection of the pre-impact condition, directs simultaneous or sequential inflation of multiple airbags prior to the impact. The airbags are shaped and positioned in a manner to allow for maximum surface area when inflated to absorb the force of the impact and to provide safe deceleration with an optimum volume of gas inflated in the air bags.

It is an additional object of the present invention to provide a safety landing system having a control system and a plurality of inflatable air bags where the activation of the air bags is affected by the control system having a processor which analyzes data submitted thereto by a variety of a pre-collision sensors, including radar, lasers, ultrasound devices, IR devices, or any combination of sensors capable of measuring the parameters of the vehicle indicative of a pre-impact condition. The fabric of the air bags maximizes the absorption of the impact force, minimizes fire hazard, and facilitates control of the vehicle deceleration by using safety valves to minimize airbag rupture. The air bags deployed on the sides, bottom, top, rear, and front of the vehicle may be fabricated as a multi-air bag system (at least two air bags, one inside of another) with the innermost air bag being rupture-resistant in order to permit flotation of the vehicle on water.

It is still another object of the present invention to provide a safety landing system including pre-collision sensors capable of measuring deceleration rate, acceleration rate, speeds, direction, distance to the obstacle, etc. of the vehicle. The sensors are deployed both inside and outside of the vehicle. In addition, the sensor system may include telescoping mechanical sensors which are positioned at an adjustable and selective distance from the body of the vehicle. The sensor system is also capable of activating air bag deployment upon impact with the sensors, e.g., prior to the impact.

An additional object of the present invention is to facilitate the safe landing of a vehicle by predicting a potential accident by sensors which trigger a control system that activates the system producing continuous audio/video images of the event filmed by rapid sequence cameras. The recorded audio/video images are stored in a memory unit for a period of time surrounding the accident.

The present invention is a safety pre-impact deceleration system for vehicles such as aircraft, watercraft, etc. passenger carriers, cargo carriers, and other load bearing vehicles. The system is designed and intended to detect a potential collision, to maneuver the vehicle for safe landing, and to keep the vehicle stably floating if needed.

The safety pre-impact deceleration system of the present invention includes a parachute structure with air spaces, a.k.a., deceleration openings, formed therein. The air spaces have adjustable, controllable, and selective expansion. A control system is operatively coupled to the deceleration openings to control the expansion thereof in order to a safe landing and steering of the vehicle during the landing procedure. The system also provides for optimal positioning of the vehicle subsequent to landing.

The system further includes a plurality of pre-collision sensors for measuring various parameters of the vehicle's motion in combination with a processor analyzing data received from the sensors. The processor issues a control signal in accordance with which the control system adjusts the expansion of the deceleration openings in the parachute structure in accordance with parameters received from the sensor system to provide as safe a landing as possible.

The control signal issued by the processor constitutes a pre-collision signal which is generated once the measured deceleration rate and/or speed of the vehicle, exceeds a predetermined threshold value or deviates from predetermined "safety" limitations.

The safety system of the present invention includes a plurality of inflatable air bags which can be divided into two groups. The inflatable air bags of the first group may be associated with the parachute structure while the air bags of the second group are deployed for enveloping external surfaces of the vehicle. Both the air bags of the parachute structure and the external air bags are coupled to an inflating system by a system of inflating and deflating channels.

The air bags (inflatable balloons) are interconnected in a grid-like arrangement to form the parachute structure. In a pre-collision condition, when the air bags are substantially deflated, the parachute structure is formed of a plurality of air bags which have large sized air spaces formed therebetween. When the inflating system inflates the air bags of the parachute structure to a predetermined extent, the volume of the air spaces formed between the air bags of the parachute structure decreases accordingly. By controllable inflating/deflating of the air bags, the processor controls the air resistance or retardation of the parachute structure during free-fall of the vehicle. In this manner, the deceleration and maneuverability of the vehicle is adjusted to provide a safe landing.

The inflation system is either coupled to or includes a reservoir containing a gas source selected from the group consisting of air, hot air, helium, and other light gases, and mixtures thereof.

Alternatively, the parachute structure may include a canopy with at least one opening formed therein, preferably at the canopy vertex. In order to control the expansion of the orifice formed in the canopy of the parachute, a plurality of inflatable air bags may be installed within the orifice. The inflation of the air bags is controlled by the processor in accordance with the parameters measured by the pre-collision sensors in order to selectively adjust the overlap between the surface of the inflatable air bags and the orifice thereby enhancing the maneuverability and steering of the vehicle.

The parachute may alternatively include other means for controlling the size of deceleration openings formed in the canopy, specifically, fabric member(s), cylindrical tubes, or other structures attached to the parachute in juxtaposition to the orifice formed in the canopy may be used. In this embodiment, the processor controls a system of lines extending between the vehicle and the parachute to adjust the length of the lines in order to control the overlap between the fabric member, or tubes, etc., and the orifice.

The sensor system deployed inside and outside on the body of the vehicle includes a plurality of sensors, such as radar, lasers, ultrasound devices, infrared devices, Doppler sensors, etc., for measuring the speed and deceleration rate of the vehicle, wind speed, weight of the vehicle, time to impact, distance to the obstacle, size of the air spaces in the parachute structure, volume of air bags, etc. Additionally, the sensor system may include mechanical sensors telescopically extending external the body of the vehicle in order to generate a pre-impact signal upon the occurrence of the impact of the mechanical sensors with the obstacles.

The signals from the sensor system are supplied to the control system which includes a data processor where data and parameters of the vehicle are analyzed. The processor generates a control signal based on the analyzed information, to initiate deployment of the air bags associated with the parachute structure, or auxiliary air bags positioned on external surfaces of the vehicle.

The system of the present invention further includes an image recording system which includes a plurality of video cameras, such as rapid sequence cameras located inside and outside of the body of the vehicle and which continuously record audio/video images of the events. Once the pre-collision situation has been detected by the sensor system, the processor unit generates a collision signal to direct the audio/video image recording system to store the images surrounding the collision event in a memory unit for further retrieval and analysis.

The system triggers continuous loop cameras (such as rapid exposure rate miniature cameras) equipped with audio and video capability located at different locations on the outside and inside of the vehicle, air craft or watercraft to film and record the moments just before, during and after collision, any imminent internal or external airbag deployment, or any imminent intrusion such as damage of the camera by an intruder, or any activation of anti-theft sensors or devices. The system provides for storage and later retrieval and analysis of images in a black-box or other suitable safe storage location within the vehicle, aircraft or watercraft. The cameras or image sensors incorporate night vision, infrared tools and flash mechanisms.

A method for controlling deceleration and landing of a vehicle in accordance with the present invention includes the steps of:

sensing vehicle parameters by a plurality of sensors and supplying data corresponding to the measured parameters to a processor unit;

announcing a pre-collision situation by issuing a collision signal once the measured acceleration rate of the vehicle exceeds a predetermined threshold or deviates from a predetermined "safe" range;

deploying the parachute structure under the command of the collision signal; and adjusting the dimensions of the air spaces in the parachute structure to control deceleration rate of the vehicle for steering and safe landing of the vehicle.

If the parachute structure is formed of a plurality of inflatable air bags arranged in a grid-like structure, the method further includes the steps of actuating the inflating system to controllably inflate the air bags of the parachute structure to a predetermined extent to continually adjust the size of the air openings.

The processor unit also affects the deployment of the external air bags located at the sides, bottom, top, rear, and front of the vehicle. These external air bags are inflated under the processor control upon a pre-collision situation having been detected to achieve a safe landing, as well as for stable flotation of the vehicle when there is a water landing.

The method further includes the steps of continuously recording audio/video images of events associated with the vehicle's movement, and storing the audio/video images of the events chronologically surrounding the collision.

When the parachute structure includes a canopy with openings formed therein, the method further includes the steps of:

installing a plurality of inflatable air bags within the orifice(s) in the canopy, deploying the parachute and inflating the air bags to a predetermined amount upon the pre-collision situation having been detected in order to adjust the overlap between the surface of the air bags and the orifice(s) to control the expansion of the orifice(s). In this manner, the deceleration rate of the vehicle is maintained within predetermined safe limitations.

Still in another alternative embodiment of the present invention, the method further includes the steps of:

attaching an expansion controlling member in juxtaposition to the orifice formed in the canopy, attaching a system of lines between the expansion controlling member and the vehicle, and controlling the length of the lines in order to adjust the overlap between the expansion controlling member and the orifice for maneuverability and steering of the vehicle during collision.

These and other objects of the present invention will be fully understood from the following description of the present invention accompanied by the Drawings.

BRIEF DESCRIPTION OF THE DRAWINGS

FIG. 13 is a schematic representation of the side view of the air bag compartment of the present invention;

DESCRIPTION OF THE PREFERRED EMBODIMENTS

Figure 1:
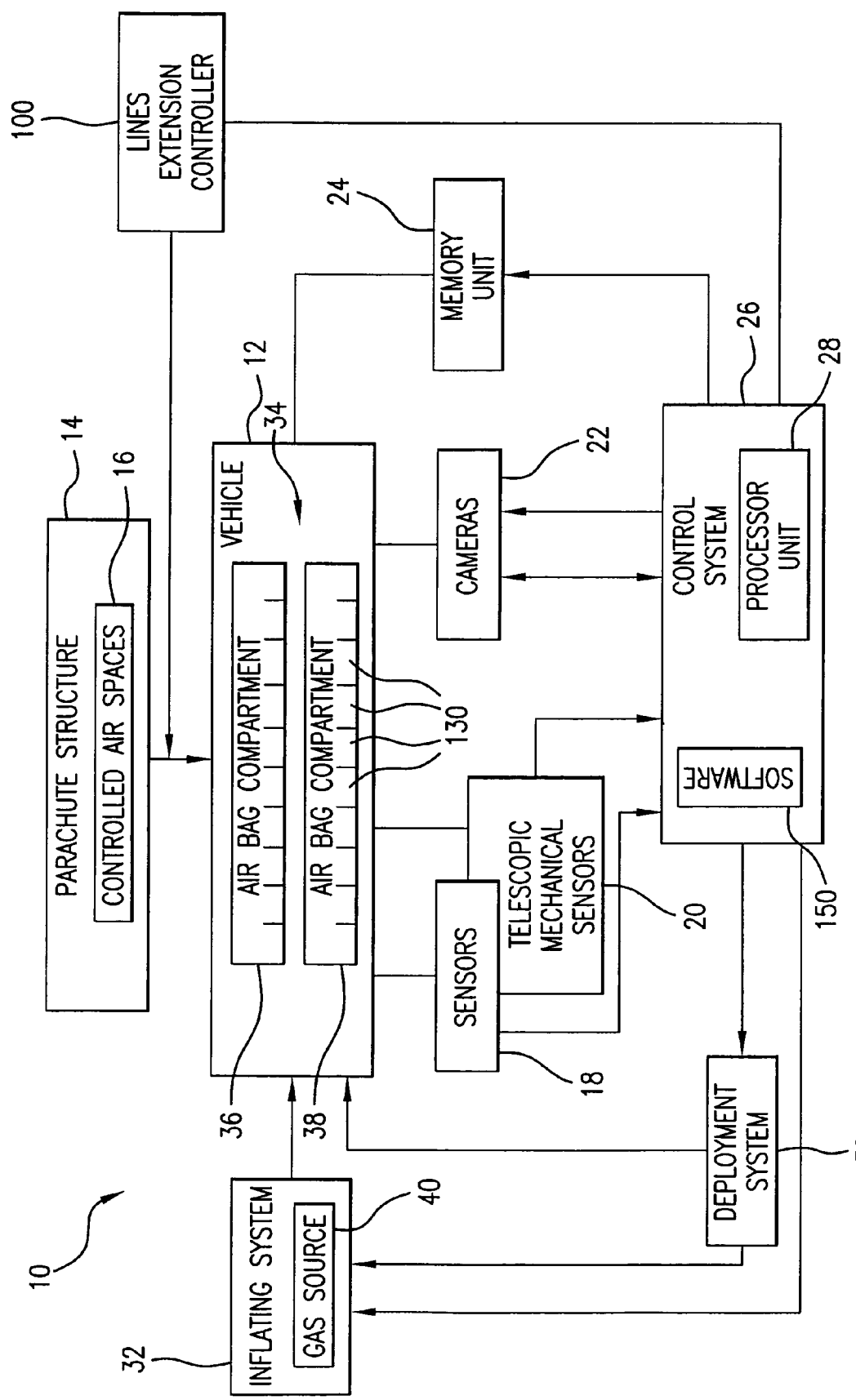
FIG. 1 is a schematic representation of the safety pre-impact inflatable deceleration system of the present invention.

Referring to FIG. 1, a pre-impact safety deceleration system 10 of the present invention is installed on a vehicle 12 which in general may be a variety of conveyances, including aircraft, watercraft, as well as land vehicles. System 10 includes a parachute structure 14 which in the normal state of operation of the vehicle is positioned in a parachute compartment in the vehicle, which is deployed once an abnormal, e.g., pre-collision situation is detected. The parachute structure 14 is envisioned in several alternative forms which will be described further herein.

All of the embodiments of the parachute structure 14 of the present invention are designed to provide enhanced control of a vehicle's landing. Enhanced control is attained by controlling in a selective manner the expansion/contraction of one or a plurality of air openings (or air spaces, or orifices) 16 formed in the parachute structure 14. The directed controlled air opening(s) expansion controls the deceleration rate of the vehicle to permit controlled maneuvering of the same to steer the vehicle to a safe landing subsequent to an emergency situation.

The safety system 10 of the present invention further includes sensor system 18 which includes a plurality of sensors for measuring different parameters of the vehicle's operation including speed of the vehicle, wind speed, weight of the vehicle, distance to an obstacle, time to impact, deceleration rate, dimensions of open air spaces 16, volume of air bags, etc. The sensor system 18 may include, but is not limited to, radar systems, lasers, Doppler effect devices, ultrasound devices, infrared detectors, and other related systems, which are deployed on both the vehicle outer surface, as well as interior to the vehicle.

In addition to the sensor system 18, telescopic mechanical sensors 20 are installed on telescopic arms and extend a predetermined distance external vehicle 12. These sensors 20 serve the function of generating a pre-collision detection signal once impact of the sensors 20 with the obstacle is detected.

An audio/video image recording system 22 includes a plurality of cameras, preferably rapid exposure rate cameras with continuous loop recording, equipped with audio/video capability located at different locations both outside and inside vehicle 12.

The system triggers continuous loop cameras (such as rapid exposure rate miniature cameras) equipped with audio and video capability located at different locations on the outside and inside of the vehicle, air craft or watercraft to film and record the moments just before, during and after collision, any imminent internal or external airbag deployment, or any imminent intrusion such as damage of the camera by an intruder, or any activation of anti-theft sensors or devices. The system provides for storage and later retrieval and analysis of images in a black-box or other suitable safe storage location within the vehicle, aircraft or watercraft. The cameras or image sensors incorporate night vision, infrared tools and flash mechanisms.

Memory unit 24 is provided for storing the recorded images from the system 22 once a pre-collision situation is detected. Memory unit 24 is positioned in a protected section of the vehicle and serves as the storage for further retrieval and analysis of information associated with the pre-collision and collision of vehicle 12 for documentation purposes.

The data from the sensor systems 18 and 20, as well as from the audio/video image recording system 22 are supplied to the control system 26 which uses the received data to control the air opening 16 of the parachute structure 14. The control system 26 includes a processor unit 28 which receives data from sensors 18 and 20 and from the image recording system 22. The processor 28 processes the received data and generates a control signal. The control signal may be a "normal" signal if the deceleration rate of the vehicle is within a "safe" predetermined range for the vehicle. Alternatively, there may be a "collision" signal which is generated once the deceleration rate measured by the sensor system 18 exceeds a predetermined threshold level or deviates beyond the "safe" range. The control system 26 also includes a software sub-system 150 which underlies the operation of the system 10 of the present invention and which will be presented in detail infra.

When the collision signal is issued by the processor unit 28, it is supplied to the audio/video image record system 22 to initiate the storing of the recorded images in the memory unit 24. The collision signal is also supplied to the parachute structure 14 to trigger deployment and controls the expansion/contraction of the air openings 16 for optimal maneuverability of the vehicle. The control of the openings 16 may be carried out either through an inflating/deflating system 32 or through a Lines Extension Controller 100, depending on the parachute structure embodiment. The collision signal is provided to the deployment system 30 which initiates the deployment of air bags associated with the parachute structure 14 as well as deployment of air bags from an air bag compartment 38.

The collision signal issued by processor unit 28 is further sent to the inflating system 32 which responsive thereto begins to controllably inflate the deployed air bags associated with the parachute structure 14. The inflating system 32 may inject air, heated air, helium, or similar light gases from a gas source 42 into the air bags as will be described further herein.

The control of inflation and deflation has several functions. Particularly, the inflation and deflation of the air bags in the parachute structure 14 increases the Rotational buoyancy of the parachute carrying capacity due to presence of light gases within the air bags. Additionally, inflation and deflation of the air bags either constituting the parachute structure, or installed within orifices made in the canopy alter the speed or deceleration of the parachute and assist in steering the vehicle. Further, when radar or other sensors of the systems 18 and 20 detect an imminent impact with land or water, multiple onion-shaped air bags in the air bag compartment 38 are triggered to inflate exterior of the vehicle 12 along possible vehicle contact impact points.

Figure 2:
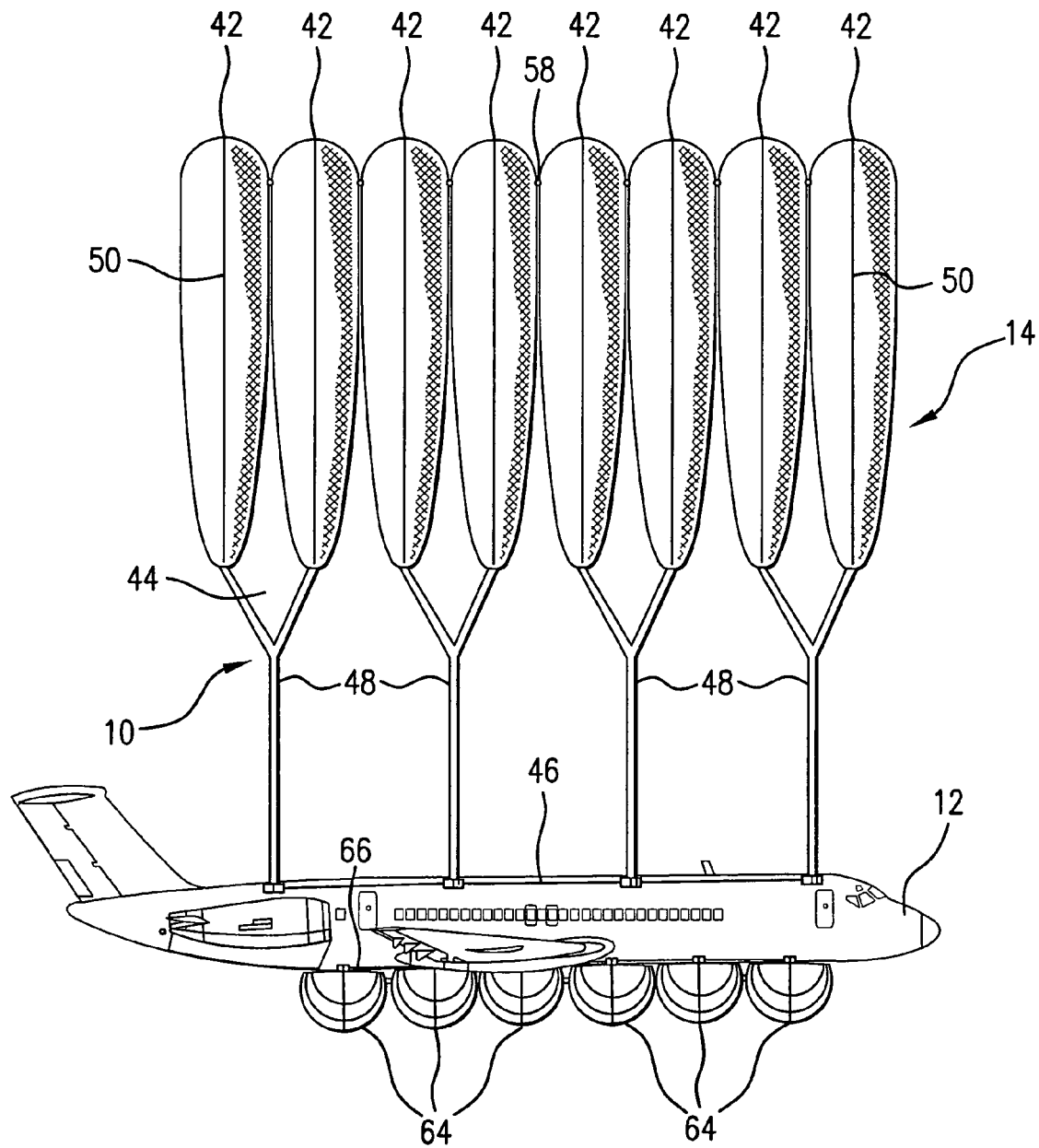
FIG. 2 is a schematic representation of the side view of a vehicle (aircraft) during the deployment of the air bags associated with the parachute structure and the bottom of the aircraft.
Figure 3:
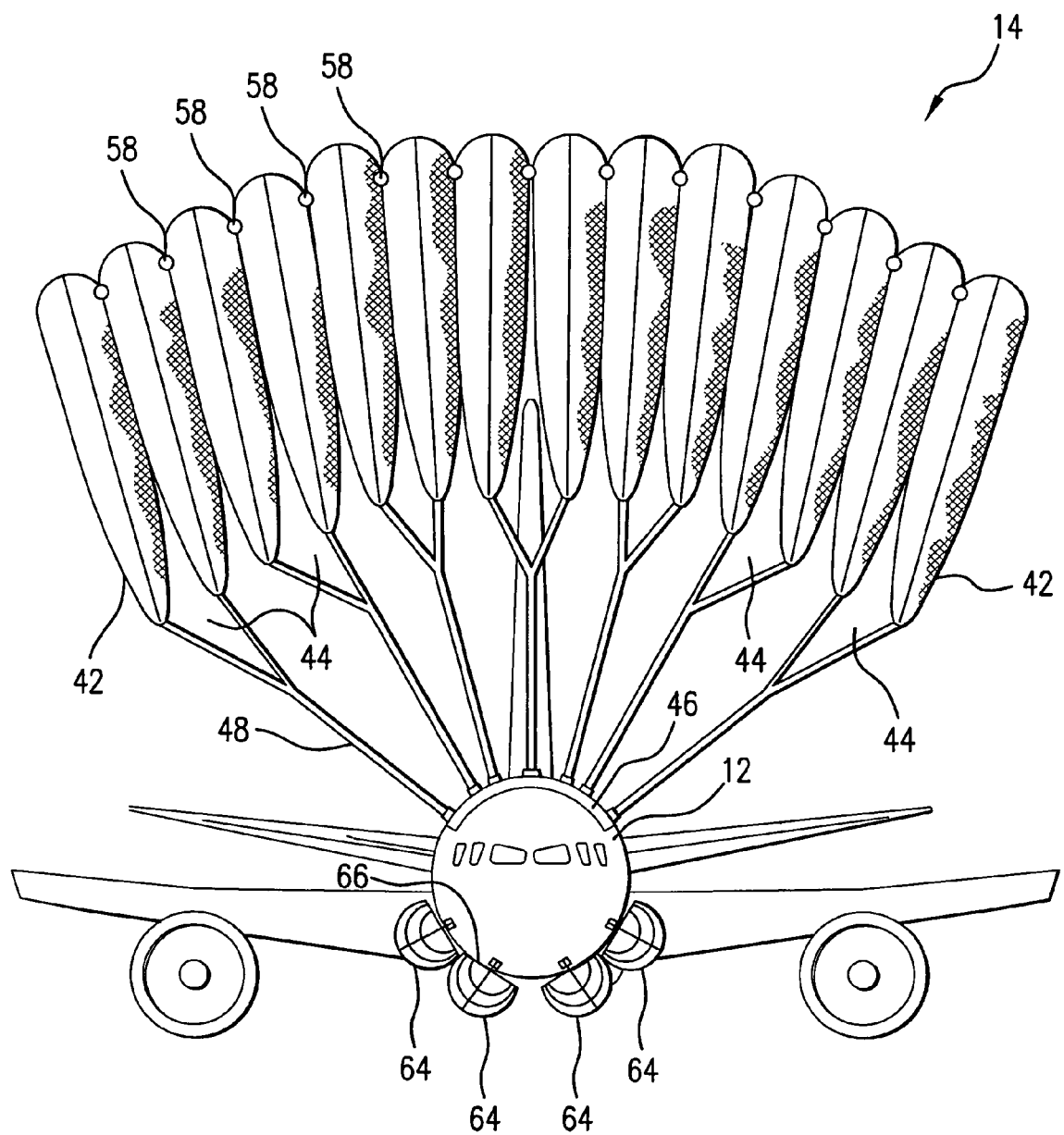
FIG. 3 is a schematic representation of the front view of the aircraft with the air bags of the parachute system and external air bags deployed as a result of the pre-collision detection.

The air bag system 34 of the present invention includes multiple inflatable air bags having variable sizes and shapes which are designed to carry the vehicle. For example, as shown in FIGS. 2 and 3, for the parachute structure 14, air bags 42 may be employed having an extended body. For undersurface and sides of the vehicle 12, air bags 64 may be used which are placed within one another in an onion-shaped configuration and are housed in air bag chambers 136 of the air bag compartment 38 at the exterior of the vehicle. Positioning is provided along the possible contact impact points to provide maximum protection during vehicle collision.

When the pre-collision sensors 18 and 20 sense potential impact of the vehicle with an obstacle, they generate a pre-collision signal. Alternatively, data is supplied to the processor unit 28 of the control system 26 to be analyzed and the pre-collision or collision signal is generated by the processor unit 28. The control system 26, upon receiving either the pre-collision signal or measured data from the sensors generates a control signal to control the operation of the inflatable air bags 42, 64. Inflating system 32 injects the inflation gas into the inflatable air bags after a signal is received by the control system 26 to expand the inflatable bags which are initially folded within the air bag compartments 36 and 38. The inflator is connected to the gas source 40 in which a gas generating material is contained which generates gas for inflation of the air bags. A pyrotechnic or similar composition may be used to provide the gas generating material.

Figure 4:
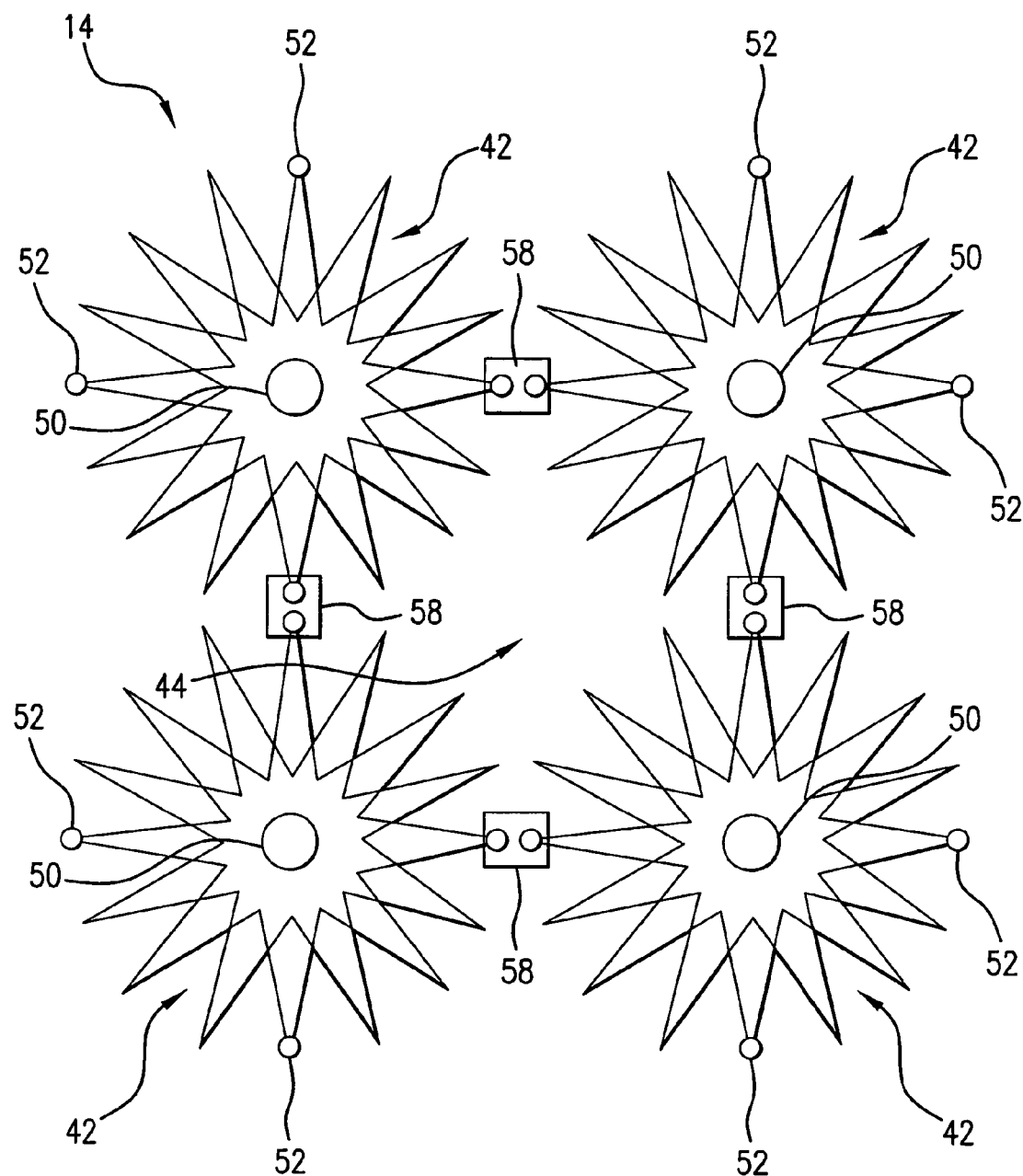
FIG. 4 shows schematically a portion of the parachute structure of the present invention illustrating deflated top air bags coupled each to the other to form a grid-like parachute structure.
Figure 5:
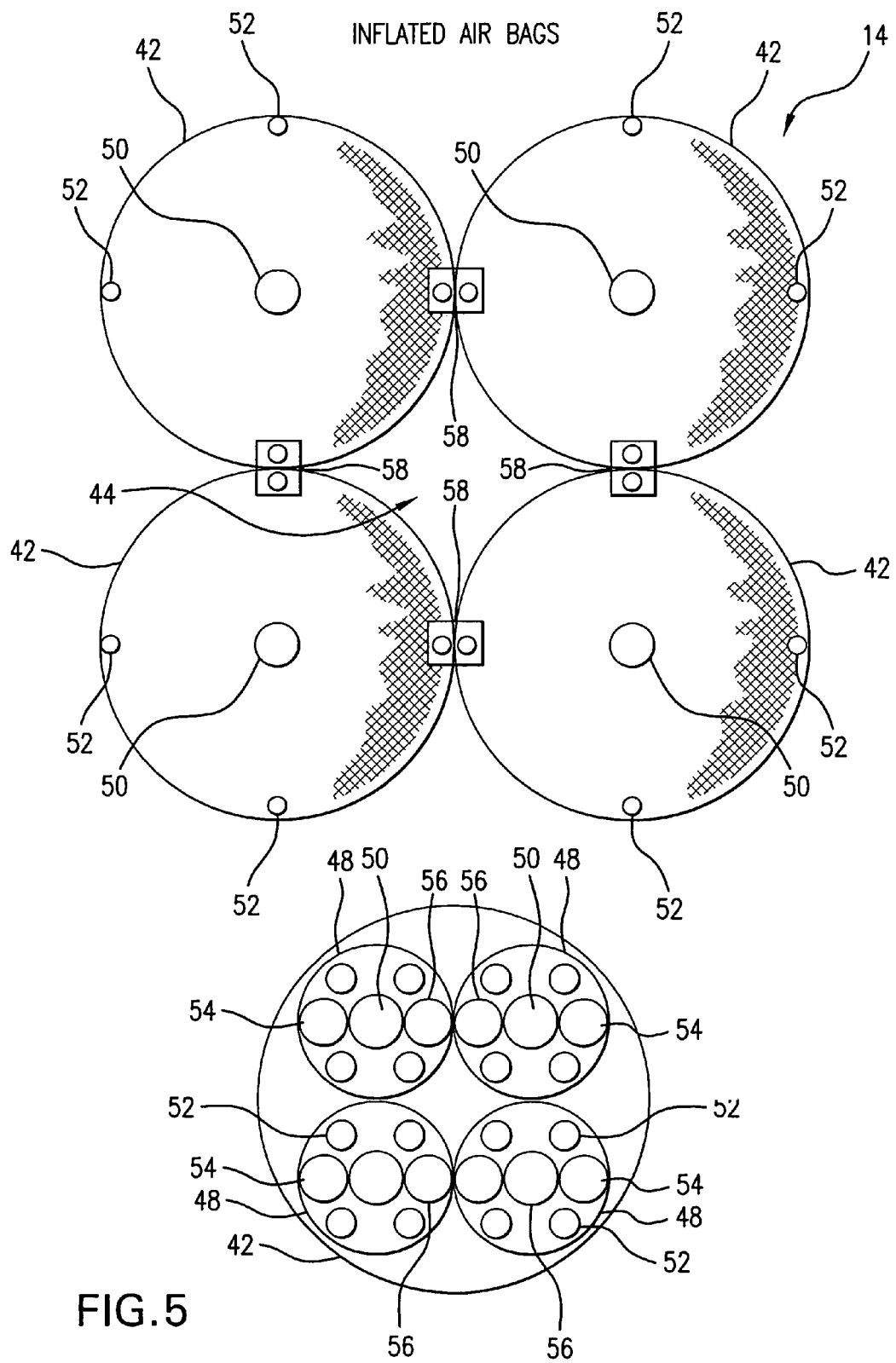
FIG. 5 is a schematic representation of the parachute structure of FIG. 4 with the inflated air bags.

Referring to FIGS. 2-5, the safety pre-impact inflatable deceleration system 10 of the present invention includes a plurality of air bags 42 associated with the parachute structure 14. The air bags 42 are arranged and connected in an array to form the overall parachute structure 14. A plurality of air cells (or air spaces) 44 are formed between the air bags 42. The number of air bags associated with the parachute structure 14 depends on the size and weight of the vehicle. Hundreds of individual air bags 42 may be arranged in a grid fashion. The air bags 42 are attached to a frame 46 of vehicle 12 by means of lines 48. As shown in FIGS. 4 and 5, the lines 48 include anchoring lines (ropes) 50 and suspension elements 52. The lines 48 may also include inflation/deflation pipes 54 and 56, respectively, which are best shown in FIG. 5.

The air bags 42 are formed of fabric that can retain helium or other gases for the length of time estimated for collision and a short time thereafter. Internal coating of the air bags is formed from a material composition that is impervious to helium or other light gases.

The anchoring rope 50 is attached to a central location of each air bag 42 and extends from the frame 46 of the upper part of the vehicle 12 to the top of the air bag 42 for maximum support. The point of attachment of the anchoring rope 50 to the air bag 42 is strengthened by a high strength fabric that gives additional strength and prevents slippage and tearing of the air bag at the site of attachment to the anchoring rope during deployment of the air bag.

Figure 6:
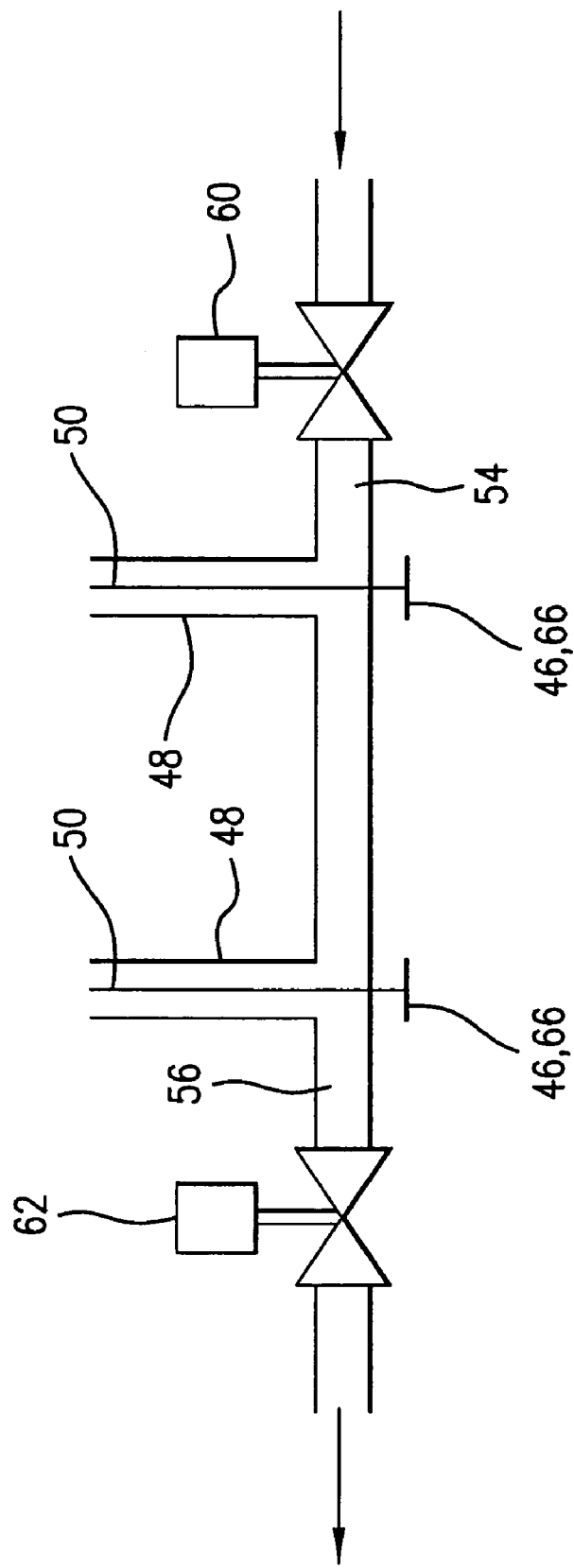
FIG. 6 shows schematically an electronic inlet valve for inflation and an outlet valve for deflation of the air bags.

The pipes 54 and 56, shown in FIGS. 5 and 6, are attached at the base of each air bag 42. The pipes 54, 56 run alongside the anchoring rope 50, with the openings formed in the body of the air bag 42. Pipe 54 serves to inflate the air bag 42 while the pipe 56 deflates the air bag 42. The size of the inflating pipes 54 may be larger than that of the deflation pipes 56. In addition to the anchoring ropes 50, there may be four or more suspension elements (ropes) 52 for each air bag 42 that extends from the frame 46 of the vehicle to the top of the air bag 42, or at least to the point of attachment of each air bag to the next air bag in the same row.

Each air bag 42 is attached to the next air bag near the top in order that air cells 44 are created in the form of an inverted cone when the array of air bags is deployed. As shown in FIGS. 4 and 5, the points 58 of attachment of air bags 42 each to the other are formed by suturing of the fabric of the adjacent air bags in order to aid in withstanding the wind force and maintaining a parachute configuration. Alternatively, the points 58 of attachment of adjacent air bags 42 can be formed by means of a rope or grid similar to fisherman's net. Steering lines may be used to manually or electronically assist in landing of the vehicle. The length of the steering lines is controlled by the control system 26 through the line extension controller 100, based on wind, aircraft direction, velocity, and time to impact measured by the sensors 18.

The anchoring ropes 50 and suspension elements 52 are attached and secured to the frame 46 of the aircraft by a fastening mechanism, which may include, for example bolts and/or steel wires, or other mechanical fasteners. The anchoring ropes as well as suspension elements are fabricated to be long enough to extend a distance above the aircraft which permits the use of air bags and parachute having large surface areas.

The gas reservoir 40, which may be in the form of a tank containing helium or other gases, is attached to the inflating pipes of the inflating system 32 for each air bag 42 and are manually or electronically triggered by control valves 60 and 62. As seen in FIG. 6, these valves are used to inflate the air bags in the event of imminent aircraft crash or engine failure. The operation of the valves 60 and 62 is directly based on the rate of descent, wind velocity, and the time to impact which is supplied by the sensor system 18 to the control system 26 for analysis in the processor unit 28. The deflation of the air bags may also be controlled manually or electronically under the direction of the processor unit 28 based on the rate of descent and the time to impact.

When deployed, the air bags 42 perform two main functions. First, they create a parachute effect due to the presence of air cells 44 which are created upon inflation of the air bags 42. Second, by using air, heated air, helium or other light gas, the air bags 42 act as a buoyant balloon. As is seen in FIGS. 2-5, the parachute structure 14 is formed as a grid fabricated from folded deflated air bags between which open air spaces (air cells, openings) 44 exist that minimize the effect of immediate deceleration upon deployment and provide little resistance to wind.

As the air bags 42 start to inflate under the control of the processor unit 28, the large air spaces 44 are gradually reduced to small holes at the top of the air bags while creating large air cells further down due to continuous inflation of the air bags 42. In this manner, the speed of the aircraft is gradually reduced with a gradual change of the deceleration. Upon landing on water or land, the combined parachute-balloon of the present invention continues to be inflated with helium, or other suitable gases, to help in flotation of the vehicle and to prevent the large parachute structure from falling on the vehicle. The air bags 42 require multiple long anchoring ropes 50 and suspending elements 52 internal/external the inflating and deflating pipes 54 and 56 in order to withstand high winds at relatively high altitudes.

For example, the approximate radius of a helium filled air bag 42 is approximately 6.2 meters that is sufficient to carry 1,000 kg of weight at near sea level. However, since the helium inflated air bags 42 are shaped in a parachute configuration, the weight of the aircraft that may be lifted by this parachute is much greater. In addition, the air bags 64 on the bottom and side surfaces of the aircraft act as flotation and deceleration collision cushions.

The air bags 64 may have an onion-shaped configuration and are deployed automatically by the collision signal generated by the processor unit 28 when the time until the impact approaches the time it takes to fully inflate the bottom air bags 64. These bottom air bags 64 are anchored to the bottom and side frame 66 by appropriate anchoring and fastening means. The air bags 64 are formed by at least two air bags inserted one inside of another and includes safety pressure relief valves except for the innermost air bags which are rupture-resistant and remain inflated in order to maintain flotation of the vehicle when it is in water.

As shown in FIG. 1, prior to deployment, air bags 42 are contained in the air bag compartment 36, while air bags 64 are contained in the air bag compartment 38. As will be presented further herein, the body of air bag compartments 36 and 38 is formed as grids. The walls of the body envelop the air bag fabric thus creating free air spaces within the grid prior to deployment and inflation in order to minimize the resistance of the air bag fabric to the air at the moment of deployment.

The arrangement of the system of the present invention shown in FIGS. 4-5, comprises units of four inverted cone-shaped air bags (balloons) connected together at the tops of the air bags by means of suturing or adhesive. These four balloons 42 are attached to other four balloon units around the top of the aircraft creating one row of air bag units. There are several air bag rows sufficient to cover the length of the aircraft. However, there is a minimum of two rows, one in the rear and the other at the middle or near the front of the aircraft to assist in steering. The open air cell 44 that exists between each group of four balloons is gradually reduced by inflation of the four surrounding air bags so as to substantially obliterate the free air space facing outwardly once fully inflated while simultaneously creating an air space (or air cell) 44 simulating a parachute. Each row of the 4-8 balloon units 42 with as many as 10-20 or more units per row form a structure having a convexly curved shape towards the outside and concave towards the inside portion which faces the vehicle. Each grid of air bags 42 may be rectangular, square, triangular, or honeycomb in configuration.

The size of the cell openings 44 between the inflated balloons 42 may be increased or decreased depending on the desired degree of deceleration and the direction of the aircraft. If deceleration exceeds a preset safety level, then deflation will increase the openings between the air bags. If however the acceleration exceeds a certain preset limit, more gas or air is pumped into the air bags. In order to maneuver the aircraft, decreasing the size of the openings 44 on the right side of the vehicle or aircraft causes the aircraft to tilt to the right due to increasing air resistance. Decreasing the size of the openings 44 on the left side of the aircraft will cause the aircraft to tilt to the left. Similarly, decreasing the size of the openings 44 between the air bags 42 on the rear of the aircraft causes the front of the aircraft to tilt downward. Decreasing the size of the openings 44 on the front of the aircraft results in the aircraft tilting upward. Thus, steering of the aircraft may be accomplished by controlled differential inflation and deflation at different locations of the air bags situated above the aircraft. The steering may be performed manually or electronically by the processor unit 28.

Figure 7A:
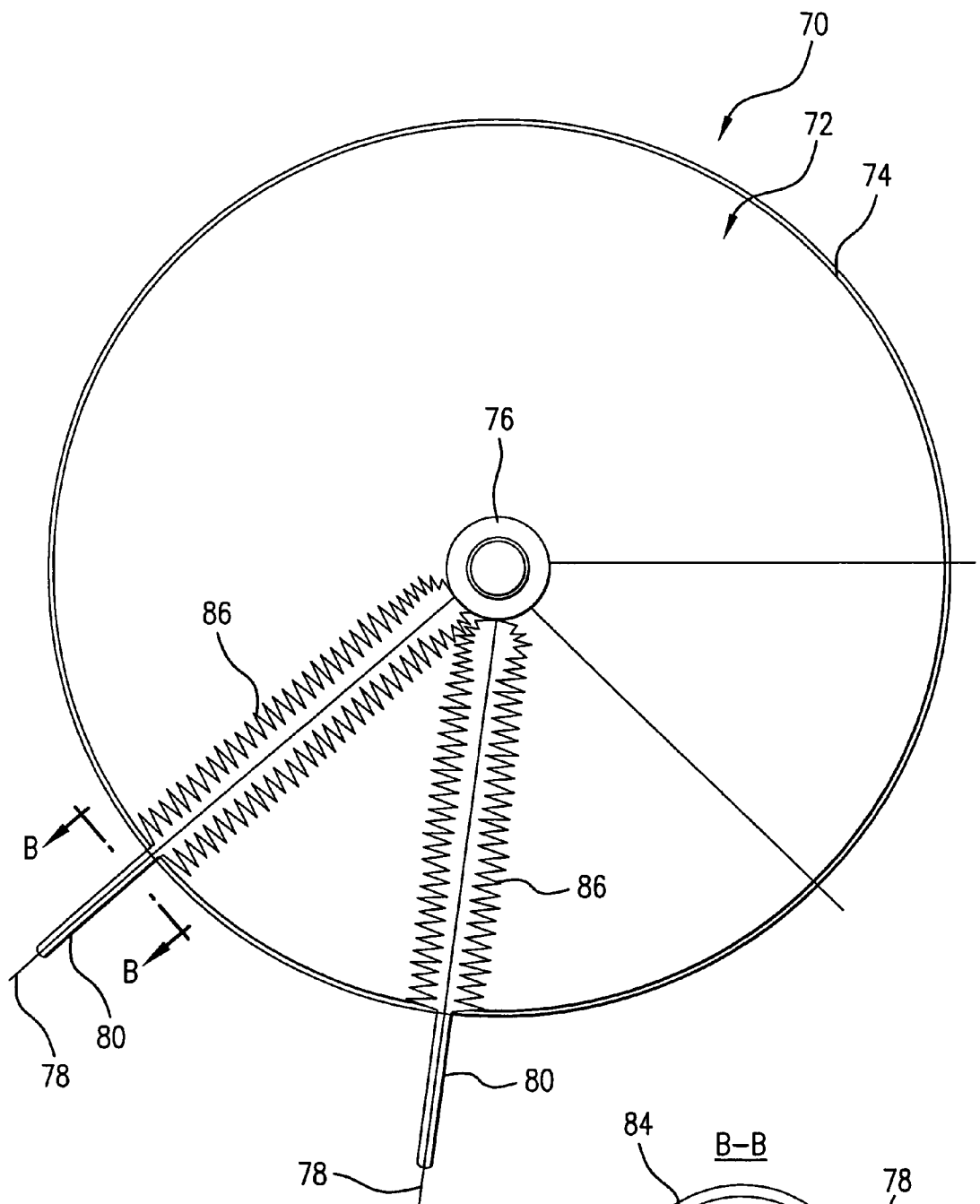
FIG. 7A is a schematic representation of the hybrid parachute of the present invention with the air bags deflated.
Figure 7B:
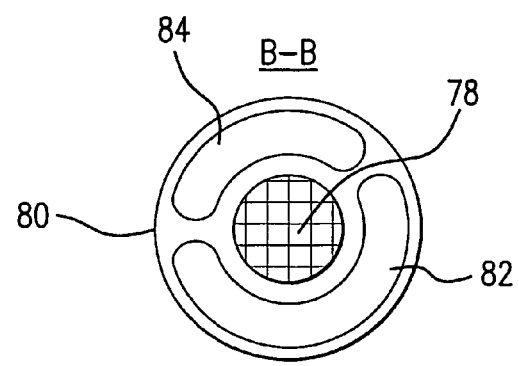
FIG. 7B is a cross-section of the line 80 of FIG. 7B taken along the B-B lines.
Figure 8:
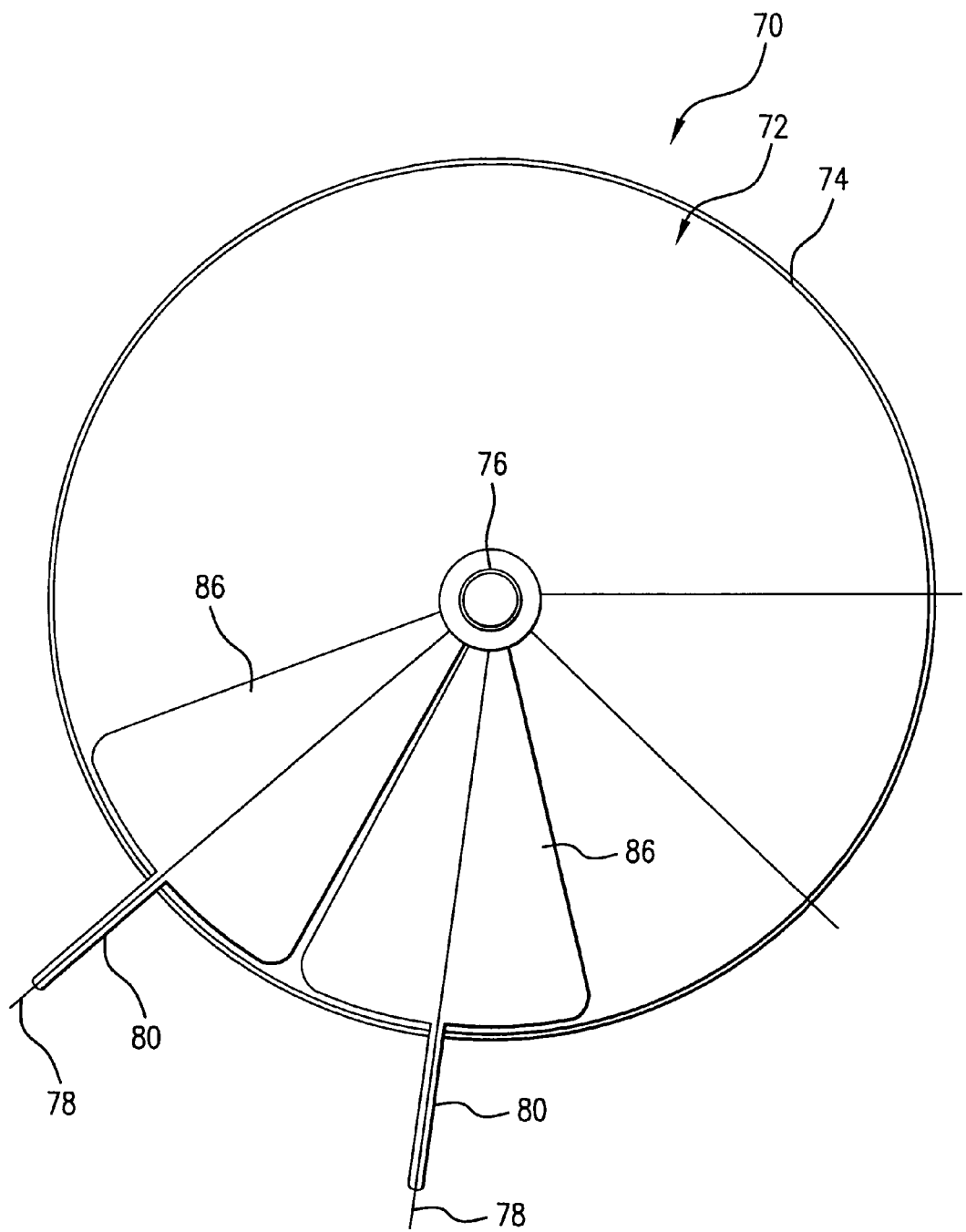
FIG. 8 is a schematic representation of the hybrid parachute structure of the present invention with the air bags inflated.

Referring to FIGS. 7A, 7B, and 8, representing an alternative embodiment of the safety system 10, a hybrid parachute 70 is shown which includes a canopy with opening 72 formed therein. This may be at the vertex of the parachute to serve the purpose of controlling deceleration of the vehicle and further offer some degree of steering. The opening 72 has a surrounding rim 74 and a central ring 76 fabricated of ropes, bridles, or other suitable materials. Attached to the ring 76 is a plurality of lines, bridles, or ropes 78 that support the parachute fabric and extend downwardly to the aircraft frame 46. Lines 78 are surrounded by tubes 80 that contain inflating channels 82 and deflating channels 84, shown in FIG. 7B. Channels 82 and 84 extend for a variable distance up to the opening at the vertex of the parachute 70.

More than one inflating and deflating channel 82, 84 may surround each line 78. At the rim 74 of the opening 72, the inflating and deflating channels 82, 84 are coupled to air bags 86 which extend from the rim 74 to the ring 76 in the center of the opening 72. Air bags 86 are deflated upon initial deployment, so as to keep the opening 72 as wide open as possible in order to minimize sudden deceleration at the moment of parachute deployment. Immediately thereafter, the air bags 86 are inflated at a rate determined by the processor unit 28 based on the desired rate of deceleration as shown in FIG. 8.

If the deceleration exceeds a preset threshold, the air bags 86 begin to deflate, thus causing less resistance to air and attaining the desired descending deceleration of the aircraft. The air bags 86 are also inflated with air, hot air, gases, or helium and other light gases as other air bags envisioned in the system of the present invention. The size of the air bags 86 may add buoyancy to the aircraft if they are inflated with gases lighter than the ambient air.

There are several alternative modifications of the hybrid parachute. The inflating and deflating channels 82 and 84 may terminate at the beginning of the air bag, e.g., along the supporting lines 78. This will further increase the parachute buoyancy and provide for additional deceleration. Additionally, the air bags 86 shown in FIGS. 7A and 8 as radially positioned within the opening 72, may be placed in a circular or grid fashion around the ring in the center of the opening at the vertex of the parachute and some distance below the main body of the parachute 70. Further, the canopy of the parachute 70 may include a plurality of openings 72 with air bags 86 associated with each opening 72 so that the expansion of this plurality of openings may be altered by inflation or deflation of the air bags 86 in order to add to the steering capability of the system 10.

Figure 9:
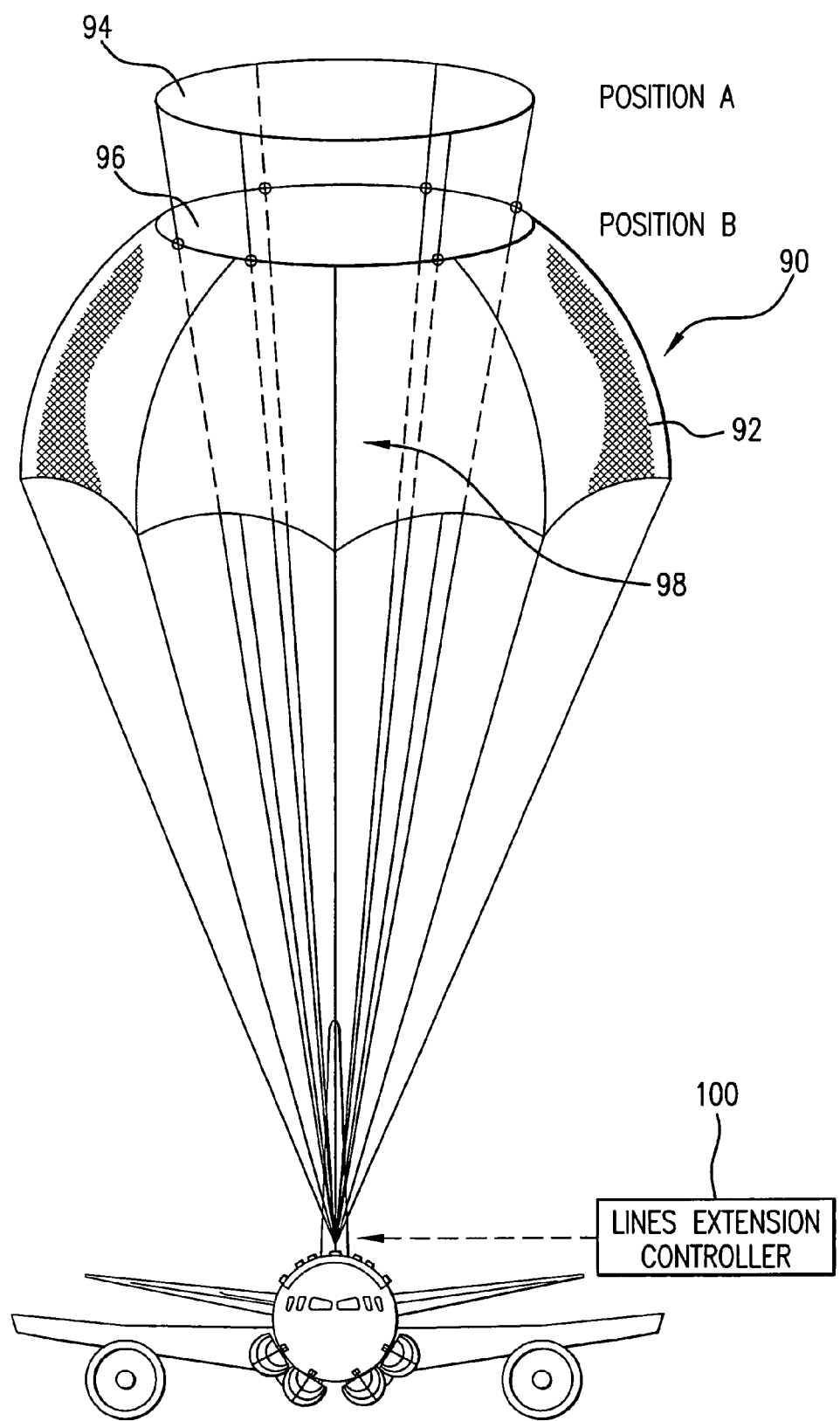
FIG. 9 is a schematic representation of the alternative implementation of the parachute structure of the safety system of the present invention with position A corresponding to the fully opened orifice and position B corresponding to a closed orifice.

Shown in FIGS. 9-12 are further alternative embodiments of the system of the present invention which do not employ inflatable air bags in the parachute system. For example, as shown in FIG. 9, a parachute 90 has a canopy 92 with the opening formed at the vertex thereof. A fabric member 94 of geometrical dimensions and shape corresponding to the opening 96 at the canopy 92 is attached to the frame 46 of the aircraft by a plurality of supporting lines 98. When the fabric member 94 is displaced from the opening 96 (position A), the opening 96 reveals the entire area thereof. If the deceleration of the aircraft with the opening 96 completely expanded exceeds a predetermined safety level, the control unit 26, particularly the processor unit 28 thereof, directs the lines extension controller 100 to pull the fabric member 94 from position A to position B to overlap the opening 96. Tightening of the supporting lines 98 causes the fabric member 94 to overlap the opening 96. This increases the resistance of the parachute to air, and results in an elevation of the deceleration rate. Loosening of the supporting lines 98 will cause the displacement of the fabric member 94 from the opening 96 thereby decreasing the deceleration of the aircraft. The fabric member 94 as herein described may be located outside the canopy of the parachute 90 or within the main body of the parachute.

Figure 10:
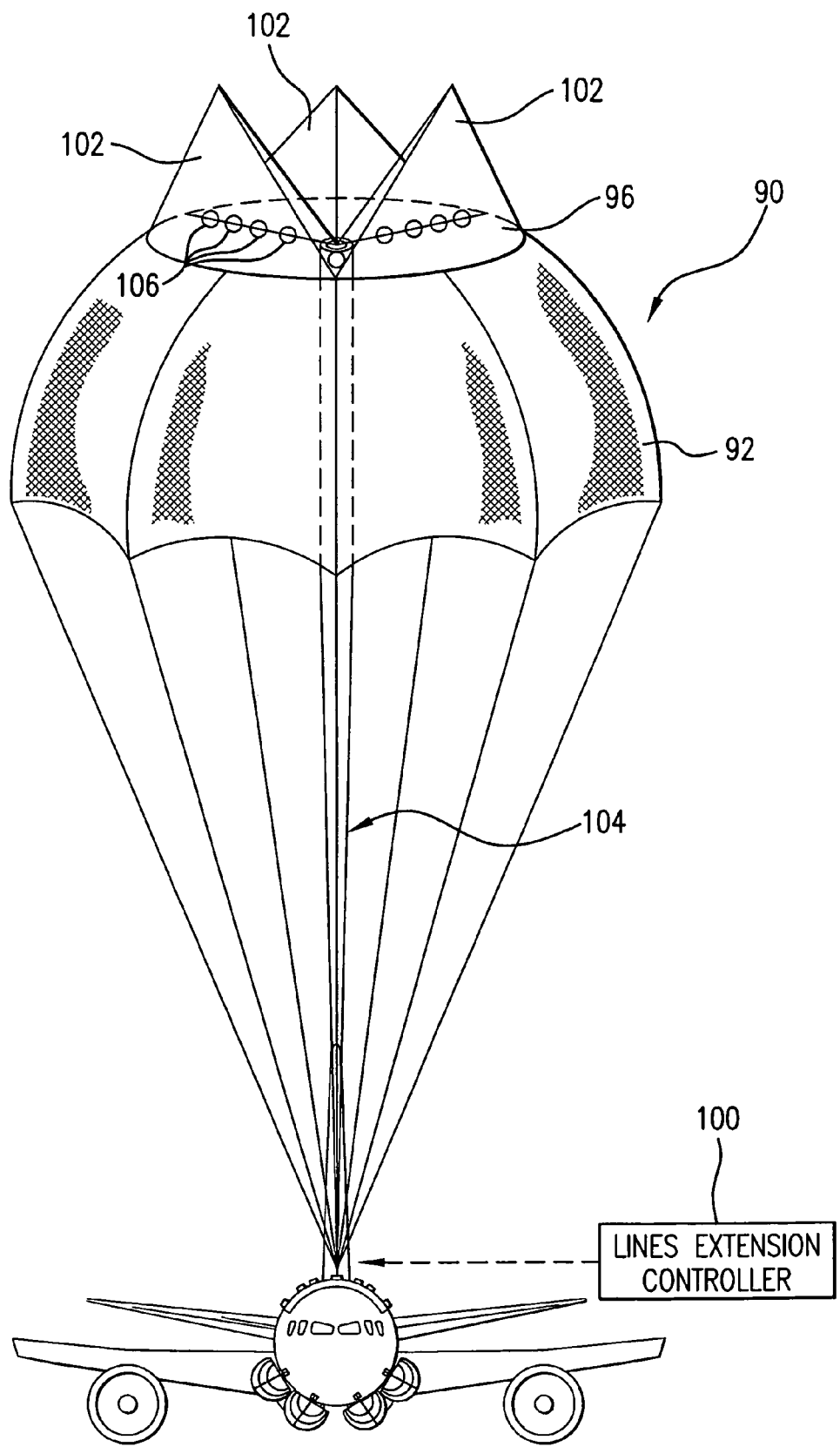
FIGS. 10 and 11 represent an alternative embodiment of the safety system of the present invention where the canopy of parachute is provided with flap members to adjust the size of the orifice at the vertex of the parachute (FIG. 10 corresponds to the open position, and FIG. 11 corresponds to the closed position)
Figure 11:
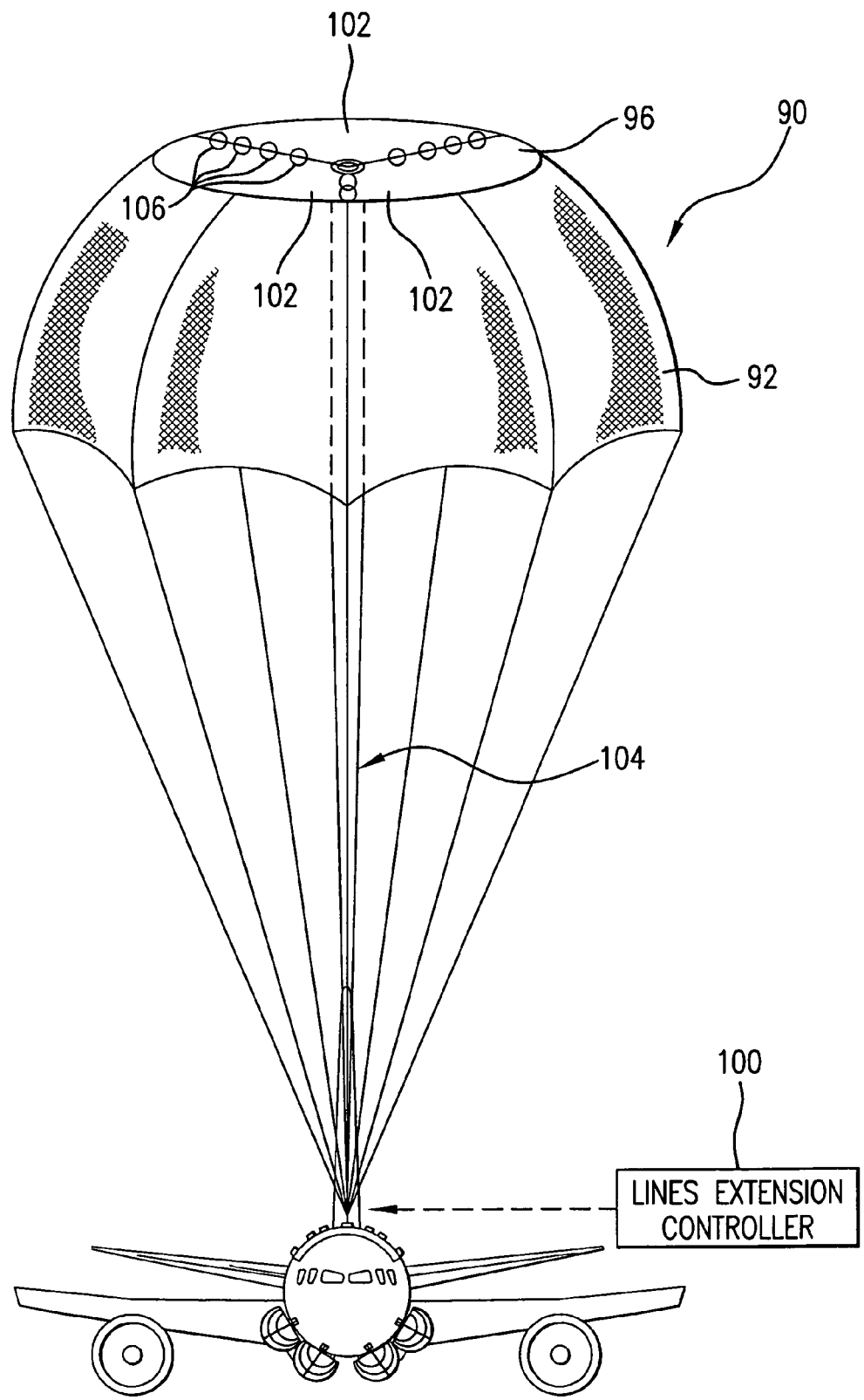

Shown in FIGS. 10 and 11, the parachute 90 has an opening 96 formed at the vertex of the canopy 92. In this alternative embodiment, two or more flaps 102 are attached to the rim of the opening 96. The ropes 104 are attached to the edges of the flaps 102 at one end thereof and to the frame 46 of the aircraft on another end thereof. These flaps 102 may be manually or electronically controlled to reduce or enlarge the size of the opening 96 formed at the apex of the parachute 90 by means of the Line Extension Controller 100 similar to that shown in FIG. 9 which is controlled by the processor unit 28. The ropes 104 converge into rings 106 extending radially from the center of the opening 96 towards the rim of the opening 96 shown in FIGS. 10 and 11. Tightening of the ropes 104 results in a smaller size opening 96 while the loosening of the ropes causes an enlargement of the opening 96.

Figures 12A, 12B:
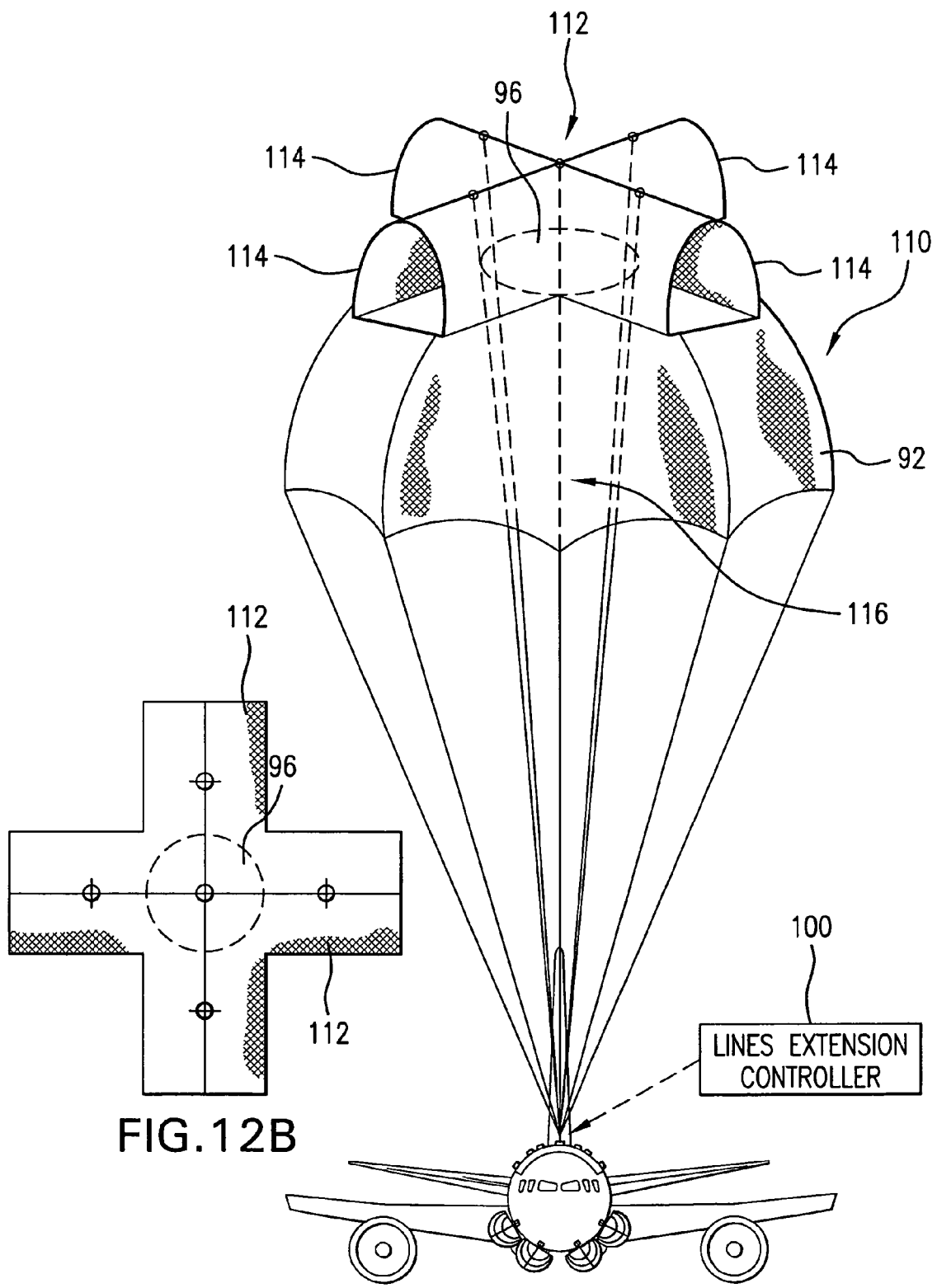
FIGS. 12A and 12B represent still another alternative embodiment of the present invention where the canopy of the parachute includes intersecting horizontal cylinders composed of a fabric-like composition to cover the orifice at the vertex of the parachute (FIG. 12B is a top view of FIG. 12A)

Shown in FIGS. 12A and 12B is another alternative embodiment of the hybrid parachute 110 having the opening 96 formed in the canopy 92. The opening 96 is covered by cylindrical fabric tubes 112 that are attached to the top of the parachute 110 in intersecting horizontal fashion having cross-sectional openings 114. The lines, bridles or ropes 116 are attached to the roof of the cylinders 112 and may be manually or electronically deployed to reduce or enlarge the size of the cross-sectional openings 114 of the cylindrical tubes 112.

Lines 116 converge into rings located in the canopy of the parachute and extend downwardly to the vehicle steering system and are controlled by the processor unit 28. Tightening of the ropes 116 results in a smaller size opening 114, while loosening the ropes 116 causes enlargement of the openings 114. In this manner, the processor unit 28 acting through the controller 100, controls the deceleration and steering of the vehicle. With regard to FIGS. 9-12, the parachute may include fabric members of different shapes such as oval, circular, spherical to overlap the orifice formed in the apex of the canopy of the parachute.

Some degree of steering may be attained by changing the effective size of each compartment or segment of the opening particularly if two or more parachutes are deployed. Different sizes of the openings at the vertex of the parachute will facilitate steering of the parachute towards the direction of the relatively smaller opening. The canopy may include the openings to be positioned at various locations that may be connected by the lines, ropes, or bridles. These openings may be reduced or enlarged by different mechanisms such as air bag inflation and deflation within these openings. The lines or ropes run along the canopy of the parachute and traverse the openings in the canopy, at which point the lines or ropes are surrounded by air bags or balloons that upon inflation minimizes the opening formed in the canopy.

When the aircraft falls on the land or water, Global Positioning Systems (GPS) may be used to assist in the location and retrieval of the vehicle.

The calculated diameter of the parachute is about twice the length of the aircraft, such as Cirrus SR-20 which measures 26 feet in length, and has a maximum weight of 3,000 pounds. The calculated diameter of the parachute for this aircraft is 54 feet (or 16.46 meters). Assuming that the parachute is a hemisphere, then the volume of air within is 1,168 $m^3$, and the area of the parachute is 426 $m^2$. If the outer radius is increased by one meter, to allow for Helium inflation without compromising the volume of the air within the parachute, then the volume of Helium surrounding the parachute is 479 $m^3$. This volume of Helium is sufficient to lift approximately 479 Kg or 1050 pounds (at near sea level) independent of the effect of the parachute. If the radius is increased by 2 meters, to permit Helium inflation without compromising the volume of the air within the parachute, then the volume of Helium surrounding the parachute is 1,075 $m^3$. This volume of Helium is sufficient to lift approximately 1,075 Kg or 2,365 pounds in addition to the effect of the parachute. Thus, if the current parachute design (16.459 meters inner diameter and 20.459 meters outer inflated diameter) can carry a plane with a maximum weight of 3,000 pounds, then theoretically with the use of Helium, the maximum weight of the plane that can be carried is about 6,000 pounds (allowing for the extra weight of the balloons).

For jets such as the Boeing 747 being 70 meters long and weighing more than 394,000 Kg, a parachute that has a radius of 70 meters and an opening large enough to prevent rapid deceleration is envisaged where the opening is gradually reduced by any of the mechanisms described supra. Thus, for speeds of 600 mph or 880 feet per second, it may take a Boeing 747 approximately 42 seconds to decelerate to 0 mph at 1 g, 4.58 seconds at 6 g, and 1.8 seconds at 15 g.

Figure 14:
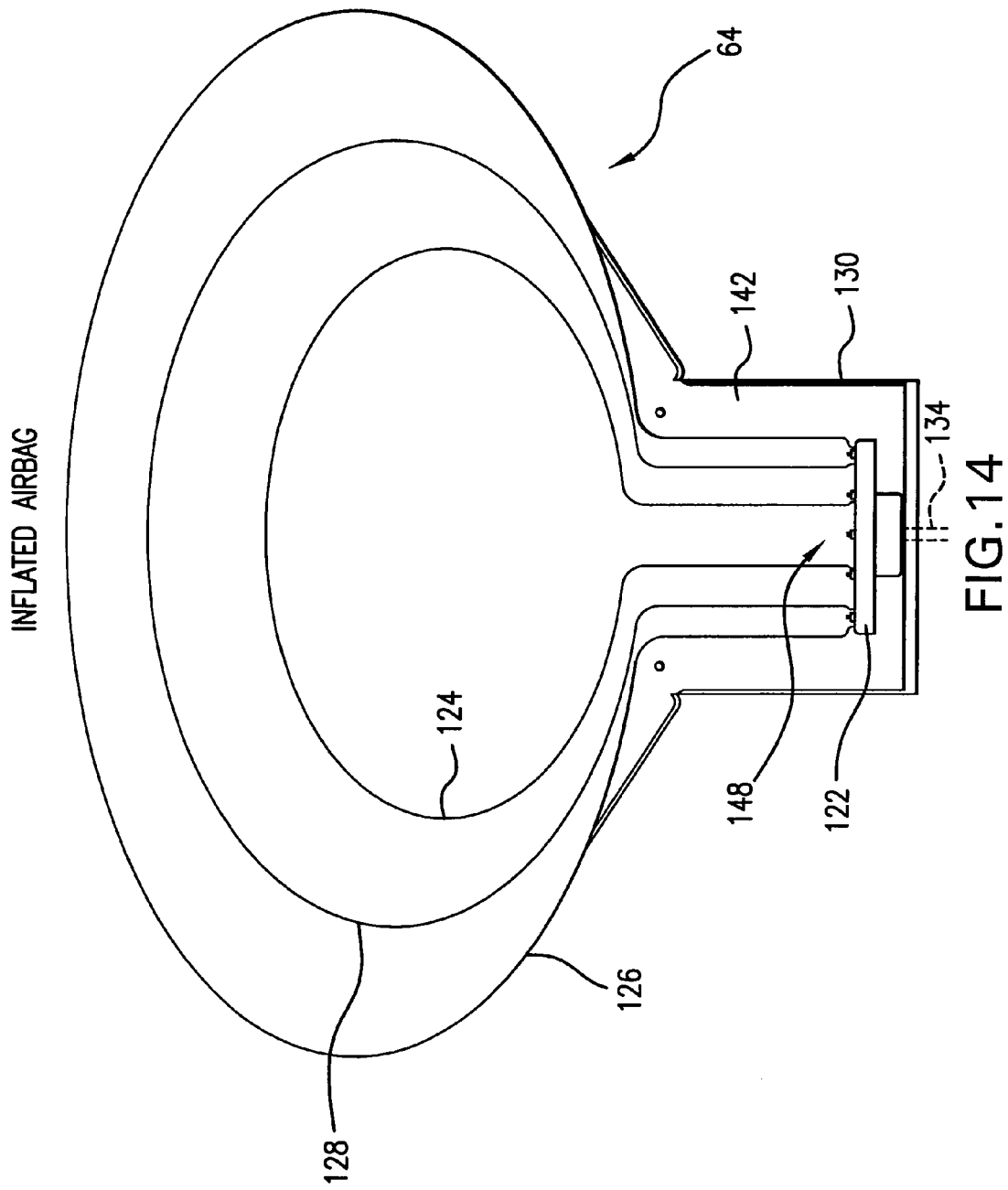
FIG. 14 is a longitudinal cross-section of an air bag chamber of the present invention with the air bags inflated as the result of pre-collision condition detection.

Referring to FIGS. 13 and 14, showing the air bag system 34 used in the present invention, such includes air bag compartments 36 and 38, as presented in FIG. 1, containing inflatable air bags 42 and 64. Pre-collision sensors 18 that sense the imminent collision, as well as mechanical sensors 20, are not shown at the FIGS. 13-16, however, it is clear from the description of the system of the present invention presented supra, that the processor unit 28 generates a pre-collision signal. The control system 26 is coupled to the deployment system 30 and the inflating system 32 to command the same to inject a predetermined volume of gas or air from the gas source (reservoir) 40 into the folded air bags 42 and 64. The air bags 42, 64 are then deployed and inflated on the exterior of the aircraft 12.

The air bag compartments 36, 38 include a plurality of air bag chambers 130. The air bags within each air bag chamber unit 130 inflate simultaneously or nearly simultaneously by one or more inflators 122. The inflating system 32 includes a plurality of inflators 122, each corresponding to a respective air bag chamber 130. When the aircraft is in imminent danger of crashing, the sensing system sends multiple radar or laser signals continuously to measure the change in distance to the ground or water, to permit the processor unit 28 to calculate the time to impact. Depending on the time to the potential impact, the control system 26 directs inflating system to inflate the air bags taking into account the time it takes to inflate the air bags. Deployment of the air bags in different chambers 130 may or may not be simultaneous, and may be triggered by one or more sensors. Air bags within each chamber may be actuated depending on the readings of the corresponding sensor or sensors without activating adjacent air bag chamber.

In another embodiment of the system of the present invention, each air bag chamber is activated based on the reading of the corresponding sensor(s), but if one or more chambers have been deployed, all air bags in all compartments will be deployed simultaneously, in order to form a bubble enveloping the aircraft formed of a plurality of inflated air bags 64 deployed from the air bag compartment 38. The aircraft then impacts into the created bubble, and the force of the impact on the aircraft and its occupants is minimized. The air bag 64 in the air bag chamber 130 of the air bag compartment 38 used on the exterior of the aircraft, is shown in FIGS. 13 and 14, and has a multi-layered air bag structure. The multi-layered air bag structure includes an inner air bag 124, outer air bag 126, and middle air bag 128 sandwiched between the air bags 124 and 128. The design allows for an optimal distribution of the forces of the impact over the entire surface of the air bags. All three air bags 124-128 within each air bag chamber 130 (a plurality of which are contained in the air bag compartment 38) inflate simultaneously or nearly so by one respective inflating outlet 132 of the inflator 122.

A plurality of air bag chambers 130 which constitute the air bag compartment 38, are mounted on the exterior of the aircraft. The air bag 64 (which includes air bags 124, 126, and 128) is packed in a folded state into the chamber 130. The cylindrical, or disk-shaped inflator or inflators 122 contains a gas generator and a plurality of inflating outlets 132 for regulating the flow of gas (air) generated by the inflator and supplied to the air bags contained within the air bag chambers 130. The system is designed so that prior to a collision, the gas generated by the inflator 122, inflates the air bags towards the outside of the vehicle and away from the vehicle occupants. The inflator receives the signal from the control system 26 through wires 134 or through a wireless coupling.

Returning to FIG. 13, a membrane 136 covers the opening of the air bag chamber 130 and keeps the air bags compactly folded. The membrane 136 is covered by the main outside cover 138 which has rupturable hinges 140 that separate upon deployment of the air bags. Hinges 140 are designed to withstand the changes in atmospheric pressure at high altitudes. The air bag chamber 130 may be contoured in alternative forms, and is fabricated of metal, with a rectangular or oval opening 142. The opening 142 shown in FIG. 14, faces the exterior of the aircraft. The inflator 122 is located at the bottom of the air bag chamber 130 with its longitudinal axis coinciding with the length or width of the aircraft depending on the location of the chamber 130. The inflator is held in place within the air bag chamber 130 by brackets 144 and the air bags 64 are attached to the inflator 122 by fastening bolts 146.

Each air bag is sewn in three-dimensional shapes using fabric made of a synthetic material or the like and has a mounting opening 148. It is attached to the bottom inner side of the chamber 130 or to the inflator 122 by means of rivets or air bag retainers 146. The air bags 64, particularly the inner, middle, and outer air bags 124-128, are folded in a bellows configuration formed in the vertical and horizontal direction in an overlapping manner, as shown in FIG. 13.

The outer inflated air bag 126 has the largest radius while the inflated innermost air bag 124 has the smallest radius. If for instance, the outer air bag 126 has a capacity of 500 liters, and the adjacent inner bag 124 has a capacity of 400 liters, then the outside air bag would require only 100 liters of gas to inflate assuming simultaneous inflation of all air bags. If the outer air bag has a capacity of 500 liters, the innermost air bag may have a capacity of 100 liters assuming five air bags per compartment.

For spherical objects, the tension in the wall of the air bag is directly proportional to the pressure times the radius and inversely proportional to the thickness of the fabric. At impact, the force applied to the air bags will be transmitted to all layers of air bags contained within. The pressure is equally distributed over the entire surface of the air bags according to LaPlace's Law. Since the outer air bag has a larger radius than the adjacent inner air bag, the tension within the outer air bag will rise to a greater degree than the inner air bags. This is due to the fact that the air bag with the larger radius will have higher tension.

As the pressure inside the air bag rises during impact, the air bags are provided with a safety mechanism of deflation if the pressure inside the individual air bag exceeds a predetermined threshold. Thus the outer air bag 126 is the first air bag to rupture or leak air or gas due to the higher tension within its walls. One or more safety pressure relief valves are incorporated into the fabric of the air bag. Also, weakly sewn pieces of fabric may be used that blow open a predetermined size patch at predetermined air bag pressures. Alternatively, fabric stitches may rupture when the air bag pressure exceeds a certain level. The fabric design is non-porous to maximize deceleration and may have flotation characteristics. Table 1 enlists the radii of air bags in comparison to the surface areas and volumes. An air bag with a volume of 50 cubic feet (or about 67 square foot area) is expected to provide adequate protection against collisions of a vehicle weighing 3000 pounds colliding at speeds of 45 mph. It requires 200 milliseconds to inflate. With the design of the present invention, one can inflate 80 square foot area of air bags within 20 milliseconds using 4 bags with radii of 1 foot 6 inches, 1 foot 4 inches, 1 foot 2 inches, and 1 foot. The maximum volume of gas to be inflated is 5 cubic feet per bag.

TABLE 1

Radii of air bags in relation to surface area, volume and the volume of gas needed for inflation.

| Radius (feet) | Surface area ($ft^2$) | Volume ($ft^3$) | Delta Volume($ft^3$)* |
|---|---|---|---|
| 3'0" | 113 | 113 | 18 |
| 2'10" | 101 | 95 | 16 |
| 2'8" | 89 | 79 | 14 |
| 2'6" | 79 | 65 | 12 |
| 2'4" | 68 | 53 | 10 |
| 2'2" | 59 | 43 | 10 |
| 2'0" | 50 | 33 | 7 |
| 1'10" | 42 | 26 | 7 |
| 1'8" | 35 | 19 | 7 |
| 1'6" | 28 | 14 | 5 |
| 1'4" | 22 | 10 | 4 |
| 1'2" | 17 | 7 | 3 |
| 1'0" | 13 | 4 | 3 |
| 10" | 9 | 2 | 2 |
| 8" | 6 | 1 | 1 |
| 6" | 3 | 0.5 | 0.5 |

*denotes the volume of inflation of the outer air bag minus the adjacent inner air bag It has been shown that for safe deceleration of 100,000 pound truck or a 30,000 pound bus such may require, respectively, an air bag with 30 and 10 times the size of a 50 cubic foot (or 67 square feet) air bag to inflate before impact. Thus, an exterior air bag 126 has to have an inflated volume of 1,500 cubic feet or an area of 2010 square feet for 100,000 pound truck, and 500 cubic feet or 670 square feet for a 30,000 pound bus. Massive air bags of this nature may not be practical to implement. However, with the subject overlapping air bag design, 9 overlapping air bags with a radius of 5 feet for the outer bag and eight other bags with radii that decreases by 2 inches per bag will have total surface area of 2146 square feet which would provide adequate deceleration for a 100,000 pound truck. Similarly for a 30,000 pounds bus, six overlapping air bags with a maximum radius of 3 feet 6 inches for the outer bag and 5 air bags with radii that decreases by 2 inches provides an overall area of 975 square feet.

Large size air bags may be particularly useful for safe deceleration of large watercraft and aircraft. For aircraft, the air bag chambers 130 are positioned at locations where impact is anticipated. For watercraft, the air bag may lie between the center of gravity and the center of buoyancy of the watercraft.

The choice of fabric for the air bags depends on the type of aircraft or watercraft. Generally, a fabric that is air tight is needed for maximum deceleration. It should also be fire deterrent, lightweight, and provide for flotation. The fabric may have safety pressure relief valves, such as weakly sewn portions of the fabric that ruptures when a predetermined pressure inside the air bag is exceeded.

The size of the air bags depends largely on the size and type of the aircraft, the location of occupants, and the forces of impact. It has been calculated that 50 cubic feet of inflated fabric (approximately 67 square feet) can be folded into about a volume of one cubic foot. The design of the present invention uses onion-shape multiple air bags to allow for the largest surface area with the least inflation volume. In order to fold the air bags into the smallest storage space possible, fabric quality and special treatment may help to overcome the challenge. For example, mechanical compression of synthetic yarn may be used.

The shape of the air bag depends on the shape, size, and type of the aircraft, the location of the occupants, and the forces of impact. Although being shown in spherical shapes, the air bags also may be oval, rectangular, cubical, or formed in other shapes to provide maximum protection against impact. The shape of the air bag may contain protruding finger-like projections (not shown in Figures) for added deceleration effect.

The sensors 18, 20 used in the system 10 of the present invention, may include commercially available sensors such as radar, laser, Doppler-based sensors, etc., to detect relative speed of objects, as well as distance, and anticipatory sensors. The size of the objects can be determined using a multiplicity of sensors oriented in different directions. In the simplest version, radar or laser sensors are utilized that activate the inflatable safety devices once an object is detected within the safety impact distance (the minimum distance that allows the air bags to fully inflate). The radar pre-collision sensors may be substituted with other sensors that can calculate distance to the obstacle and time to impact.

The choice of the sensors depends on factors such as the vehicle used, cost, and durability of the sensors, manufacturing, failure rate, false positive and false negative signals, as well as interference with other electromagnetic waves or sensors, etc.

Mechanical sensors 20 may be utilized which use telescoping arms that protrude external the aircraft a predetermined distance by means of hydraulic pumps. The sensors are similar to the shock sensors that sense collision. A combination of sensors may be utilized in the same aircraft. In another embodiment of mechanical sensors, the sensors may be coupled to a member which is mounted external to the vehicle for displacement with respect to the aircraft prior to landing or touchdown. In this manner, the mechanical sensors contact the landing surface prior to touchdown and provide appropriate control signals for effecting a safe landing as has previously been discussed.

The sensors are placed at various locations of the aircraft. The pre-collision sensor may also trigger rapid frame video cameras or visual sensors located on an antenna or antenna-like projections or similar elevated location outside as well as within the aircraft to film the events before and after the impact. The camera lenses are connected by wires to a recording box located within the aircraft. The cameras record not only visual image but also sound on a permanent storage medium. The cameras cover 360 degrees angle, and may be battery operated or use other sources of power. The cameras are connected to the sensors and receive therefrom input to activate the film sequence simultaneously with the air bag deployment.

Infrared or night vision and flash light sources may be provided for filming when it is dark. In order to avoid any delay in the activation of the camera(s), there will be continuous loop recording of the exterior as well as the interior of the aircraft or watercraft, however the images will be saved only if the camera is triggered. In addition, the sensor will have an indicator showing whether the camera is functional, or wherein for instance due to inclement weather, the sensor may not be operational.

Figure 15:
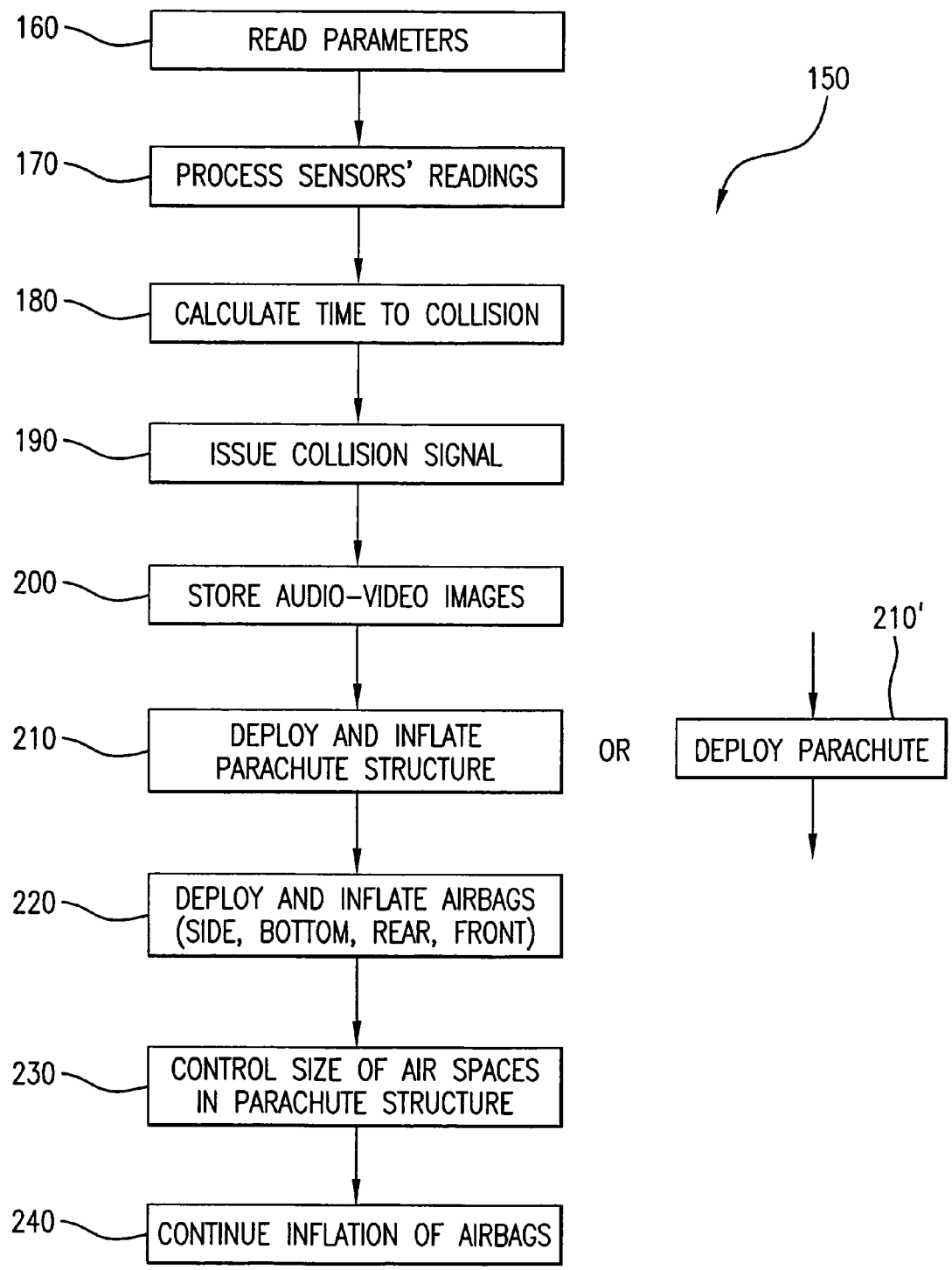
FIG. 15 is a flow chart diagram of the algorithm underlying the operation of the safety system of the present invention.

Referring to FIG. 15, there is shown a flow chart diagram of the software algorithm 150 underlying the operation of the system 10 of the present invention which is a part of the control system 26. The flow chart starts with the block 160 "Read Parameters". The sensor system 18 measures and detects different parameters such as speed of the vehicle, deceleration, direction of travel, distance to obstacle, speed of wind, etc. From the block 160, the logic flows to block 170 "Process Sensors' Reading" where the processor unit 28 processes the information received from the sensor system 18. As a result of processing, the processor unit 28 calculates, time to collision, in block 180, and issues a collision signal in block 190 "Issue Collision Signal".

From the block 190, the logic flows to block 200 "Store Audio-Video Images" where the images of the recorded events surrounding the collision are stored in the memory unit 24.

In block 210 "Deploy and Inflate Parachute Structure", the collision signal issued in block 190 by the processor unit 28 is supplied to the deployment system 30 which directs the air bags in the air bag compartment 36 to deploy. Simultaneously, the collision signal is supplied to the inflating system 32 which inflates the air bags 42. Further, the logic flows to block 220 "Deploy and Inflate Air Bags (Side, Bottom, Rear, Front)", where the deployment system 30 under the control of the processor unit 28 deploys the air bags 64 from the chamber 130 at locations predicted to be subjected to the potential impact and inflates them. From block 220, the logic flows to block 230 "Control the Size of Air Spaces in Parachute Structure", where the air spaces either in the parachute-like structure shown in FIGS. 1-4, or in accordance with the principles shown in FIGS. 7 and 8, are controlled to attain a safe landing of the vehicle.

Further, the logic flows to block 240 "Continue Inflating of Air Bags", where the control system 26 directs the inflating system 32 to continue inflating of the deployed air bags with a predetermined rate and a predetermined time period in order to provide for continuous flotation of the vehicle if it lands on water.

Alternatively, the algorithm 150 is adapted for parachute structures shown in FIGS. 9-12 where the control of the orifice in the canopy of the parachute is controlled by means other than inflated air bags. For this alternative embodiment of the system of the present invention, the block 210 is replaced with subsystems 210' "Deploy Parachute". In block 210', the control of the size of the air spaces in the parachute canopy is performed not by changing inflation rates of the air bags, but by controlling the block 100 to change the length of the ropes extending between the frame of the aircraft and the fabric member 94 (FIG. 9), or flaps 102 (FIGS. 10 and 11), or cylindrical tubes 112 shown in FIG. 12. In block 240, continuing inflation affects only the air bags on the bottom, side, rear, and front of the vehicle.

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. Safety pre-impact deceleration system for vehicles, said system comprising:
    a parachute structure including at least one air cell formed therein, said at least one air cell having a controllable expansion thereof,
    a control system operatively coupled to said at least one air cell to control the expansion thereof,
    a sensor system measuring predetermined operational parameters of the vehicle, and
    a processor unit analyzing data corresponding to said measured operational parameters and issuing a control signal once the measured operational parameters deviate from a predetermined threshold range, said control signal being coupled to said control system to control the expansion of said at least one air cell, thereby maintaining said operational parameters within said predetermined threshold range.

2. The system of claim 1, wherein said sensor system is a pre-collision sensor system including a plurality of deceleration sensors, and wherein said control signal is a pre-collision signal generated by said processor unit once the measured deceleration rate exceeds a predetermined threshold value.

3. The system of claim 1, further including a plurality of air bags interconnected in a grid-like array to form said parachute structure, a plurality of said air cells being formed between said air bags.

4. The system of claim 1, further including:
    a plurality of first inflatable air bags located in proximity to said at least one air cell of said parachute structure and attached to the vehicle through a system of connecting lines.

5. The system of claim 3, further comprising:
    an inflating system coupled to a gas reservoir and including a plurality of pairs of inlets and outlets, and
    a plurality of pairs of inflating and deflating channels, each of said plurality of inflating and deflating channels being coupled between a respective one of said plurality of inflatable balloons and a respective pair of inlets and outlets of said inflating system,
    wherein said control signal actuates said inflating system to inflate at least a portion of said plurality of the inflatable air bags to a controllable extent to control said expansion of said air cells and said at least portion of said plurality of the first inflatable air bags to attain a safe range of deceleration for the vehicle.

6. The system of claim 4, further comprising:
an inflating system coupled to a gas reservoir and including a plurality of pairs of inlets and outlets, and
a plurality of pairs of inflating and deflating channels, each of said plurality of inflating and deflating channels being coupled between a respective one of said plurality of inflatable balloons and a respective pair of inlets and outlets of said inflating system,
wherein said control signal actuates said inflating system to inflate at least a portion of said plurality of the first inflatable air bags to a controllable extent to create a predetermined overlap between said at least one air cell and said at least a portion of said plurality of the first inflatable airbags to attain a safe range of deceleration for the vehicle.

7. The system of claim 1, wherein said gas reservoir contains a gas selected from the group consisting of: air, hot air, helium, light gases, and a mixture thereof.

8. The system of claim 6, wherein said parachute structure includes a plurality of said air cells formed therein, and
a plurality of said first inflatable air bags operatively coupled to each of said plurality of air cells to control expansion thereof.

9. The system of claim 1, further comprising a plurality of second inflatable air bags attached to the vehicles at predetermined areas thereof.

10. The system of claim 1, further comprising a fabric member movably positioned in proximity to said at lest one air cell,
a relative disposition between said fabric member and said at least one air cell being adjusted to control said expansion of said at least one air cell in accordance with said control signal.

11. The system of claim 1, further comprising a plurality of flap-members attached to said parachute structure in proximity to said at least one air cell, said control signal adjusting the positioning of said flap-members between open and closed positions thereof to control the expansion of said at least one air cell.

12. The system of claim 1, further comprising cylindrical tubes made of a fabric and attached to said parachute in proximity to said at least one air cell, said cylindrical tubes having cross-sectional openings, the size of said cross-sectional openings being adjusted to control the expansion of said at least one air cell in accordance with said control signal.

13. The system of claim 2, further comprising a plurality of video cameras attached at predetermined locations on the vehicle to continually record audio/video images, said pre-collision signal issued by said processor unit being operatively coupled to said plurality of video cameras to actuate storage regime of the recorded audio/video images in a memory module.

14. The system of claim 13, wherein said plurality of video cameras include rapid sequence cameras with continuous loop recording.

15. The system of claim 1, further comprising a deployment system controlled by said control signal to deploy said parachute structure.

16. The system of claim 1, wherein said parachute structure includes a plurality of said air cells, wherein said control system adjusts expansion of respective ones of said plurality of air cells in a predetermined fashion, thereby steering the movement of the vehicle.

17. The system of claim 15, further comprising an inflating system, wherein said deployment system includes a plurality of air bag chambers, each air bag chamber containing a plurality of folded air bags, wherein upon detection of a pre-collision situation, said deployment system triggers the deployment of at least a portion of said plurality of the folded air bags, and wherein said inflating system inflates said plurality of air bags in at least one respective one of said plurality of the air bag chambers.

18. The system of claim 17, wherein said sensor system includes a plurality of sensors, each of said plurality of the air bag chambers includes respective ones of said plurality of sensors.

* * * * *